US012793321B2

(12) United States Patent
Korolev et al.

(10) Patent No.: US 12,793,321 B2
(45) Date of Patent: Nov. 10, 2026

(54) TEXTURE GENERATION USING PROMPTS

(71) Applicant: Snap Inc., Santa Monica, CA (US)

(72) Inventors: Sergei Korolev, Playa Vista, CA (US); Mason Liu, Los Angeles, CA (US); Vladislav Shakhrai, Los Angeles, CA (US); Aleksei Stoliar, Los Angeles, CA (US); Mikhail Vasilkovskii, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 60 days.

(21) Appl. No.: 18/740,313

(22) Filed: Jun. 11, 2024

(65) Prior Publication Data

US 2025/0378620 A1 Dec. 11, 2025

(51) Int. Cl.

| | |
|---|---|
| ***G06T 15/04*** | (2011.01) |
| ***G06F 40/40*** | (2020.01) |
| ***G06T 5/70*** | (2024.01) |
| ***G06T 17/20*** | (2006.01) |

(52) U.S. Cl.

CPC ................ *G06T 15/04* (2013.01); *G06T 5/70* (2024.01); *G06T 17/20* (2013.01); *G06F 40/40* (2020.01); *G06T 2200/04* (2013.01)

(58) Field of Classification Search

CPC ........... G06T 15/04; G06T 5/70; G06T 17/20; G06T 2200/04; G06T 2200/24; G06T 11/001; G06T 19/006; G06F 40/40; G06F 40/00

See application file for complete search history.

(56) References Cited

U.S. PATENT DOCUMENTS 7,050,655 B2 * 5/2006 Ho .......................... G06T 15/04 348/42
8,832,201 B2 9/2014 Wall
9,105,014 B2 8/2015 Collet et al.
9,749,270 B2 8/2017 Collet et al.
(Continued)

FOREIGN PATENT DOCUMENTS

CN 109863532 6/2019
CN 110168478 8/2019
(Continued)

OTHER PUBLICATIONS

Liu, Yuxin, "Text-Guided Texturing by Synchronized Multi-View Diffusion", [Online]. Retrieved from the Internet URL https arxiv. org pdf2311.12891v1, Nov. 21, 2023, 1-10 (Year: 2023).*
(Continued)

*Primary Examiner* — Michael Le
(74) *Attorney, Agent, or Firm* — Schwegman Lundberg & Woessner, P.A.

(57) ABSTRACT

Described is a system for generating textures by receiving a prompt from a developer; accessing a three dimensional head mesh; generating a textured three dimensional head mesh by: inputting the prompt into a stable diffusion model; retrieving a plurality of two dimensional images for the texture; and projecting the plurality of two dimensional images onto the three dimensional head mesh; accessing a camera feed from a camera system of a user, the camera feed including a head of the user; and applying a first content augmentation corresponding to the textured three dimensional head mesh to the head of the user in the camera feed.

20 Claims, 13 Drawing Sheets

(56) References Cited

U.S. PATENT DOCUMENTS

| | | | |
|---|---|---|---|
| 9,911,073 B1 | 3/2018 | Spiegel et al. | |
| 9,980,100 B1 | 5/2018 | Charlton et al. | |
| 10,155,168 B2 | 12/2018 | Blackstock et al. | |
| 10,158,589 B2 | 12/2018 | Collet et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,348,662 B2 | 7/2019 | Baldwin et al. | |
| 10,432,559 B2 | 10/2019 | Baldwin et al. | |
| 10,454,857 B1 | 10/2019 | Blackstock et al. | |
| 10,656,797 B1 | 5/2020 | Alvi et al. | |
| 10,657,695 B2 | 5/2020 | Chand et al. | |
| 10,762,174 B2 | 9/2020 | Denton et al. | |
| 10,872,451 B2 | 12/2020 | Sheth et al. | |
| 10,880,246 B2 | 12/2020 | Baldwin et al. | |
| 10,895,964 B1 | 1/2021 | Grantham et al. | |
| 10,896,534 B1 | 1/2021 | Smith et al. | |
| 10,933,311 B2 | 3/2021 | Brody et al. | |
| 10,938,758 B2 | 3/2021 | Allen et al. | |
| 10,964,082 B2 | 3/2021 | Amitay et al. | |
| 10,979,752 B1 | 4/2021 | Brody et al. | |
| 10,984,575 B2 | 4/2021 | Assouline et al. | |
| 10,992,619 B2 | 4/2021 | Antmen et al. | |
| 11,010,022 B2 | 5/2021 | Alvi et al. | |
| 11,030,789 B2 | 6/2021 | Chand et al. | |
| 11,036,781 B1 | 6/2021 | Baril et al. | |
| 11,063,891 B2 | 7/2021 | Voss | |
| 11,069,103 B1 | 7/2021 | Blackstock et al. | |
| 11,080,917 B2 | 8/2021 | Monroy-hernández et al. | |
| 11,128,586 B2 | 9/2021 | Al Majid et al. | |
| 11,188,190 B2 | 11/2021 | Blackstock et al. | |
| 11,189,070 B2 | 11/2021 | Jahangiri et al. | |
| 11,199,957 B1 | 12/2021 | Alvi et al. | |
| 11,218,433 B2 | 1/2022 | Baldwin et al. | |
| 11,229,849 B2 | 1/2022 | Blackstock et al. | |
| 11,245,658 B2 | 2/2022 | Grantham et al. | |
| 11,249,614 B2 | 2/2022 | Brody | |
| 11,263,254 B2 | 3/2022 | Baril et al. | |
| 11,270,491 B2 | 3/2022 | Monroy-Hernández et al. | |
| 11,284,144 B2 | 3/2022 | Kotsopoulos et al. | |
| 12,346,995 B2 | 7/2025 | Liu et al. | |
| 2003/0031381 A1* | 2/2003 | Ho | G06T 13/40 382/285 |
| 2011/0115798 A1 | 5/2011 | Nayar et al. | |
| 2017/0113140 A1 | 4/2017 | Blackstock et al. | |
| 2018/0113587 A1 | 4/2018 | Allen et al. | |
| 2018/0115503 A1 | 4/2018 | Baldwin et al. | |
| 2018/0198743 A1 | 7/2018 | Blackstock et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0035149 A1* | 1/2019 | Chen | G06V 40/166 |
| 2019/0097958 A1 | 3/2019 | Collet et al. | |
| 2019/0188920 A1 | 6/2019 | Mcphee et al. | |
| 2019/0280997 A1 | 9/2019 | Baldwin et al. | |
| 2020/0306637 A1 | 10/2020 | Baldwin et al. | |
| 2020/0372127 A1 | 11/2020 | Denton et al. | |
| 2020/0410575 A1 | 12/2020 | Grantham et al. | |
| 2021/0074047 A1 | 3/2021 | Sheth et al. | |
| 2021/0089179 A1 | 3/2021 | Grantham et al. | |
| 2021/0104087 A1 | 4/2021 | Smith et al. | |
| 2021/0168108 A1 | 6/2021 | Antmen et al. | |
| 2021/0170270 A1 | 6/2021 | Brody et al. | |
| 2021/0192823 A1 | 6/2021 | Amitay et al. | |
| 2021/0209825 A1 | 7/2021 | Assouline et al. | |
| 2021/0225058 A1* | 7/2021 | Chand | G06V 10/56 |
| 2021/0240315 A1 | 8/2021 | Alvi et al. | |
| 2021/0243482 A1 | 8/2021 | Baril et al. | |
| 2021/0266277 A1 | 8/2021 | Allen et al. | |
| 2021/0281897 A1 | 9/2021 | Brody et al. | |
| 2021/0285774 A1 | 9/2021 | Collins et al. | |
| 2021/0306290 A1 | 9/2021 | Voss | |
| 2021/0306451 A1 | 9/2021 | Heikkinen et al. | |
| 2021/0385180 A1 | 12/2021 | Al Majid et al. | |
| 2021/0405831 A1 | 12/2021 | Mourkogiannis et al. | |
| 2021/0409535 A1 | 12/2021 | Mourkogiannis et al. | |
| 2022/0012929 A1 | 1/2022 | Blackstock et al. | |
| 2023/0237725 A1 | 7/2023 | Zoss et al. | |
| 2024/0249459 A1 | 7/2024 | Bradley et al. | |
| 2025/0029346 A1* | 1/2025 | Vircíková | G06V 10/54 |
| 2025/0378643 A1 | 12/2025 | Korolev et al. | |

FOREIGN PATENT DOCUMENTS

| | | |
|---|---|---|
| WO | 2013166588 | 11/2013 |
| WO | 2018081013 | 5/2018 |
| WO | 2018102562 | 6/2018 |
| WO | 2018129531 | 7/2018 |
| WO | 2019089613 | 5/2019 |
| WO | WO-2025259490 A1 | 12/2025 |
| WO | WO-2025259492 A1 | 12/2025 |

OTHER PUBLICATIONS

Zhang, Lon Gwen, "Dream Face Progressive Generation of Animatable 30 Faces under Text Guidance", arxiv.org, Cornell University Library, 201OLIN Library Cornell University Ithaca, NY 14853, [Online]. Retrieved from the Internet URL https arxiv.Org pdf 2304.03117, Apr. 1, 2023, 34 pgs (Year: 2023).*

"International Application Serial No. PCT US2025 032255, International Search Report mailed Sep. 9, 2025", 3 pgs.

"International Application Serial No. PCT US2025 032255, Written Opinion mailed Sep. 9, 2025", 8 pgs.

"International Application Serial No. PCT US2025 032261, International Search Report mailed Sep. 9, 2025", 3 pgs.

"International Application Serial No. PCT US2025 032261, Written Opinion mailed Sep. 9, 2025", 9 pgs.

Cao, Yukang, "Guide3D Create 3D Avatars from Text and Image Guidance", Arxiv Preprint Archive, [Online]. Retrieved from the Internet URL https arxiv.org pdf 2308.09705, Aug. 18, 2023, 1-25.

Liu, Yuxin, "Text-Guided Texturing by Synchronized Multi-View Diffusion", [Online]. Retrieved from the Internet URL https arxiv.org pdf 2311.12891v1, Nov. 21, 2023, 1-10.

Michel, Oscar, "Text2Mesh Text-Driven Neural Stylization for Meshes", arxiv.org, Cornell University Library, 201 Olin Library Cornell University Ithaca, NY 14853, [Online]. Retrieved from the Internet URL https arxiv.Org pdf2112.03221, Dec. 6, 2021, 15 pgs.

Richardson, Elad, "TEXTure Text-Guided Texturing of 3D Shapes", Tel Aviv University. arXiv2302.01721v1, 2023, 1-13.

Zhang, Longwen, "DreamFace Progressive Generation of Animatable 3D Faces under Text Guidance", arxiv.org, Cornell University Library, 201OLIN Library Cornell University Ithaca, NY 14853, [Online]. Retrieved from the Internet URL https arxiv.Org pdf 2304.03117, Apr. 1, 2023, 34 pgs.

"Bitmoji Customize text", [Online] Retrieved from the Internet: URL: https: web.archive.org web 20210225200456 https: support.bitmoji.com hc en-us articles 360034632291-Customize-Text-on-Bitmoji-Stickers, (captured Feb. 25, 2021), 3 pgs.

"Bitmoji Chrome Extension", [Online] Retrieved from the Internet: URL: https: web.archive.org web 20200919024925 https: support.bimoji.com hc en-us articles 360001494066, (Sep. 19, 2020), 5 pgs.

"Bitmoji", Snapchat Support, [Online] Retrieved from the Internet: URL: https: web.archive.org web 20190503063620 https: support.snapchat.com en-us a bitmoji, (captured May 3, 2019), 2 pgs.

"Manage Your Bitmoji", Snapchat Support, [Online] Retrieved from the Internet: URL: https: web.archive.org web 20190503063620 https: support.snapchat.com en-us a manage-bitmoji, (captured May 3, 2019), 3 pgs.

"Bitmoji Family", Snapchat Support, [Online] Retrieved from the Internet: URL: https: web.archive.org web 20190503063620 https: support.snapchat.com en-us article bitmoji-family, (captured May 3, 2019), 4 pgs.

"Your Own Personal Emoji", Bitstrips Inc, [Online] Retrieved from the Internet: URL: https: web.archive.org web 20150205232004 http: bitmoji.com , (captured Feb. 5, 2015), 3 pgs.

"Instant Comics Starring You and Your Friends", Bitstrips Inc, [Online] Retrieved from the Internet: URL: https: web.archive.org

(56) References Cited

OTHER PUBLICATIONS web 20150206000940 http: company.bitstrips.com bitstrips-app.html, (captured Feb. 6, 2015), 3 pgs.
"DreamShaper", [Online]. Retrieved from the Internet: https: civitai.com models 4384, 1 pg.
"HuggingFace", [Online]. Retrieved from the Internet: https: huggingface.co datasets gsdf EasyNegative tree main, 1 pg.
"HuggingFace EasyNegative", [Online]. Retrieved from the Internet: https: huggingface. co datasets gsdf EasyNegative, 5 pgs.
"Image Posted by Kenny", [Online]. Retrieved from the Internet: https: civitai. com images 1158596?period=AllTimeandperiodMode=publishedandsort=Newestandview=categoriesandmodelVersionld=15236andmodelld=4823andpostld=282592, 1 pg.
Carnahan, Daniel, "Snap is Offering Personalized Video Content Through Bitmoji TV", Business Insider, [Online] Retrieved from the Internet: URL: https: www.businessinsider.com snap-offers-personalized-video-content-through-bitmoji-tv-2019-12, (2019), 10 pgs.
Chen, Rui, "Fantasia3D Disentangling Geometry and Appearance for High-quality Text-to-3D Content Creation", [Online]. Retrieved from the Internet: https: fantasia3d.github.io , (Sep. 27, 2023), 11 pgs.
Constine, Josh, "Snapchat launches Bitmoji merch and comic strips starring your avatar", TechCrunch, [Online] Retrieved from the Internet: URL: https: techcrunch.com Nov. 13, 2018 bitmoji-store , (Nov. 13, 2018), 16 pgs.
Constine, Josh, "Snapchat Launches Bitmoji TV: Zany 4-min Cartoons of Your Avatar", TechCrunch, [Online] Retrieved from the Internet: URL: https: techcrunch.com Jan. 30, 2020 bitmoji-tv , (Jan. 30, 2020), 13 pgs.
Harmeet, "Installing ControlNet in Automatic1111", [Online]. Retrieved from the Internet: https: weirdwonderfulai.art resources installing-controlnet-in-automatic1111 , (May 13, 2023), 6 pgs.
Lim, Hongkiat, "How to Install AUTOMATIC1111 for Stable Diffusion on Mac", [Online]. Retrieved from the Internet: https: www.hongkiat.com blog a1111-stable-diffusion-mac , (May 4, 2023), 16 pgs.
Liu, Hongyu, "HeadArtist: Text-conditioned 3D Head Generation with Self Score Distillation", Cornell University Computer Science Computer Vision and Pattern Recognition, (Dec. 12, 2023), 17 pgs.
Macmillan, Douglas, "Snapchat Buys Bitmoji App for More Than $100 Million", The Wallstreet Journal, [Online] Retrieved from the Internet: URL: https: www.wsj.com articles snapchat-buys-bitmoji-app-for-more-than-100-million-1458876017, (Mar. 25, 2016), 5 pgs.
Newton, Casey, "Your Snapchat friendships now have their own profiles—and merchandise", The Verge, [Online] Retrieved from the Internet: URL: https: www.theverge.com 2018 11 13 18088772 snapchat-friendship-profiles-bitmoji-merchandise-comics, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: URL: https: www.theverge.com Jan. 30, 2018 16949402 bitmoji-deluxe-snapchat-customization, (Jan. 30, 2018), 2 pgs.
Reign, Ashley, "How to Add My Friend's Bitmoji to My Snapchat", Women.com, [Online] Retrieved from the Internet: URL: https: www.women.com ashleyreign lists how-to-add-my-friends-bitmoji-to-my-snapchat, (Jun. 30, 2017), 7 pgs.
Tumbokon, Karen, "Snapchat Update: How to Add Bitmoji to Customizable Geofilters", International Business Times, [Online] Retrieved from the Internet : URL: https: www.ibtimes.com snapchat-update-how-add-bitmoji-customizable-geofilters-2448152, (Nov. 18, 2016), 6 pgs.
Wang, Zhengyi, "ProlificDreamer: High-Fidelity and Diverse Text-to-3D Generation with Variational Score Distillation", [Online]. Retrieved from the Internet: https: ml.cs.tsinghua.edu.cn prolificdreamer , (Nov. 22, 2023), 36 pgs.
Zhang, Chi, "Official repo for StyleAvatar3D", [Online]. Retrieved from the Internet: https: github.com icoz69 StyleAvatar3D, 5 pgs.
Zheng, Jianfeng, "AvatarStudio: High-fidelity and Animatable 3D Avatar Creation from Text", [Online]. Retrieved from the Internet: https: github.com magic-research avatarstudio, 3 pgs.
Zhu, Junzhe, "HiFA: High-fidelity Text-to-3D Generation with Advanced Diffusion Guidance", Cornell University Computer Science Computer Vision and Pattern Recognition, (May 30, 2023), 25 pgs.
"U.S. Appl. No. 18/740,295, Examiner Interview Summary mailed Feb. 13, 2026", 2 pgs.
"U.S. Appl. No. 18/740,295, Non Final Office Action mailed Dec. 11, 2025", 25 pgs.
"U.S. Appl. No. 18/740,295, Response filed Mar. 3, 2026 to Non Final Office Action mailed Dec. 11, 2025", 10 pgs.
"U.S. Appl. No. 18/740,295, Final Office Action mailed Apr. 8, 2026", 28 pgs.

* cited by examiner

TEXTURE GENERATION USING PROMPTS

TECHNICAL FIELD

The present disclosure relates generally to texture generation, and more specifically to texture generation using prompts.

BACKGROUND

The popularity of augmented reality operating systems has enabled creation and deployment of augmented reality (AR) applications. AR operating systems combine elements of a traditional operating system with tools and libraries that allow developers to create AR experiences for users. Augmented reality operating systems are an important tool for developers and businesses looking to create compelling AR experiences for their users. They provide a powerful platform for building immersive and interactive applications that can be accessed from a wide range of devices and platforms.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
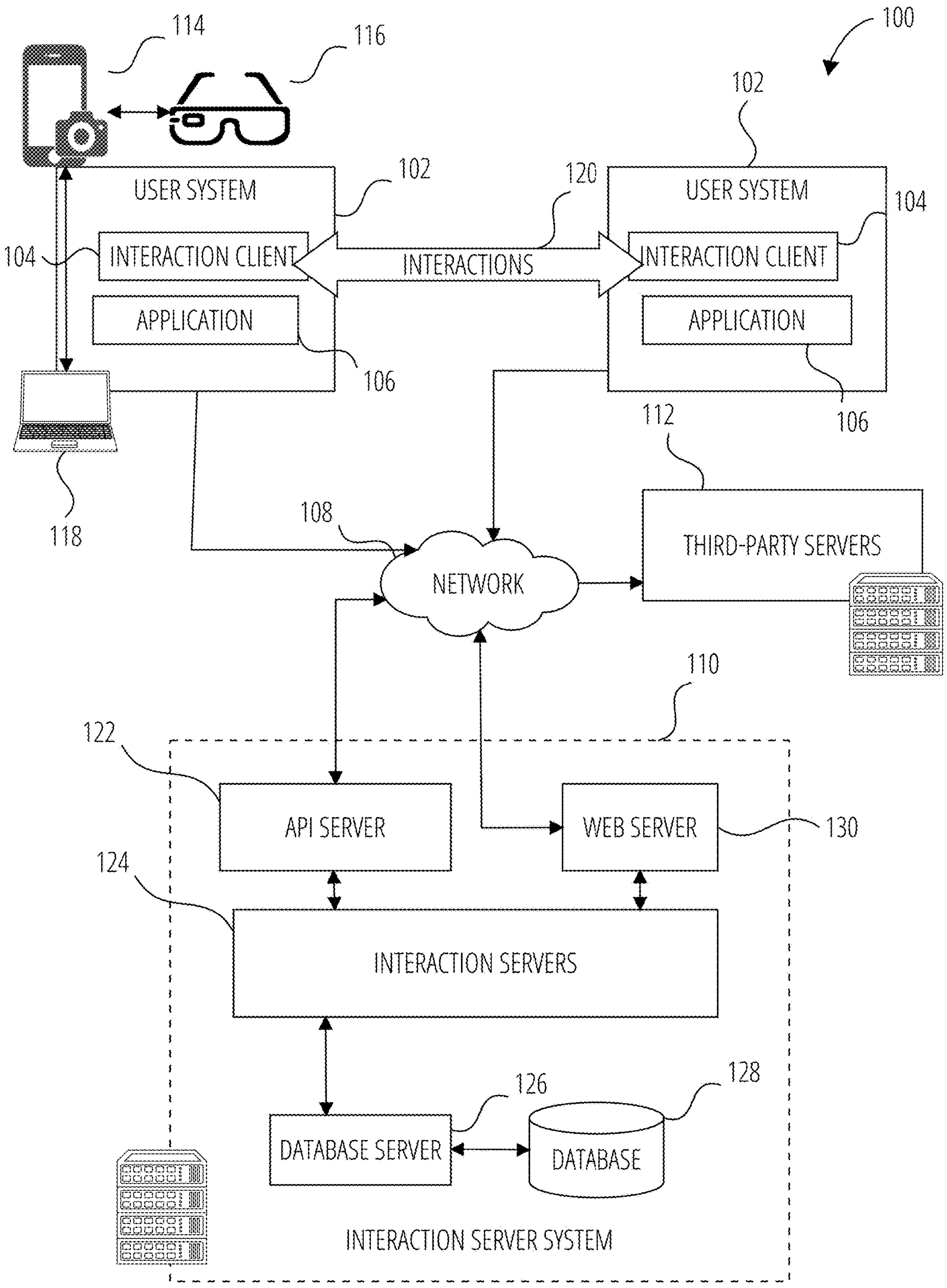
FIG. 1 is a diagrammatic representation of a networked environment in which the present disclosure may be deployed, according to some examples.

Traditional systems for generating 3D texture are technologically disadvantaged in several ways. Traditional systems often rely on predefined texture maps or manual texture painting techniques to apply textures to 3D meshes. This approach limits the flexibility and diversity of textures that can be generated, as it requires artists to manually create or select textures, resulting in a time-consuming and labor-intensive process. Additionally, traditional methods may struggle to generate complex or dynamic textures based on abstract input prompts or textual descriptions.

Furthermore, creating detailed and realistic 3D textures using traditional methods can be complex and resource-intensive, particularly for large-scale projects or applications requiring a high degree of customization. Traditional workflows may struggle to handle the complexity of generating and manipulating textures with intricate details or dynamic deformations, leading to scalability challenges and performance limitations, especially in real-time or interactive scenarios.

Traditional 3D texture generation processes often rely heavily on manual labor and artistic skill, requiring trained artists or designers to manually sculpt, texture, and rig meshes. This dependency on human expertise not only introduces subjectivity and variability into the creation process but also limits the speed and scalability of production. Moreover, traditional workflows may lack support for automated or semi-automated techniques for generating meshes based on abstract textual input or user-defined parameters.

Some embodiments described herein mitigate or eliminate the technological disadvantages of traditional systems. The interaction system revolutionizes the generation of 3D textures by leveraging image generation models and advanced projection techniques.

The interaction system receives textual prompts describing desired characteristics or features of the 3D texture. These prompts can be abstract descriptions of shapes, colors, patterns, or even specific objects or scenes. Using stable diffusion models, the interaction system generates multiple 2D views of the texture based on the input text prompts. These views capture various interpretations or manifestations of the desired texture, providing a rich and diverse set of texture representations.

The generated 2D views of the texture are then projected onto the surface of the 3D mesh. This projection process ensures that the texture aligns with the geometry of the mesh, creating a cohesive and visually appealing textured 3D representation.

To further enhance the quality and smoothness of the 3D texture, the interaction system applies an iterative smoothing technique. This involves adding noise to random views of the texture, denoising the images, and projecting them back onto the texture surface. By repeating this process iteratively, the system progressively smooths out the entire texture, resulting in a more refined and visually pleasing 3D model.

The interaction system is designed to operate in real-time, allowing for dynamic adaptation and customization of the 3D texture based on user interactions or changing input prompts. This enables interactive applications such as augmented reality experiences where users can dynamically modify the appearance of virtual objects in real-time.

The interaction system overcomes the limitations of traditional methods by leveraging diffusion models to generate textures based on abstract textual input. This approach enables the creation of diverse and dynamic textures that can adapt to various input prompts, providing unparalleled flexibility compared to manual texture painting or predefined texture maps.

With its automated and real-time capabilities, the interaction system offers scalability and efficiency advantages over traditional workflows. The ability to generate and customize 3D textures dynamically reduces the time and effort required for content creation, making it suitable for large-scale projects and interactive applications.

Moreover, the interaction system reduces the dependency on manual labor and artistic skill by automating the mesh generation and texture projection processes. This not only accelerates production but also democratizes 3D content creation, enabling a wider range of users to create high-quality 3D models without extensive training or expertise.

The interaction system revolutionizes 3D texture generation by providing a flexible, automated, and real-time solution that overcomes the disadvantages of traditional systems. By leveraging stable diffusion models, advanced projection techniques, and iterative smoothing, the interaction system enables the creation of dynamic and responsive 3D models tailored to specific input prompts or user interactions, thereby opening up new possibilities for immersive digital experiences.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in a texture generation process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the other interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 hosts multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different applications 106 (or applets) can vary based on how the menu is launched by the user (e.g., from a conversation interface or from a non-conversation interface).

System Architecture

Figure 2:
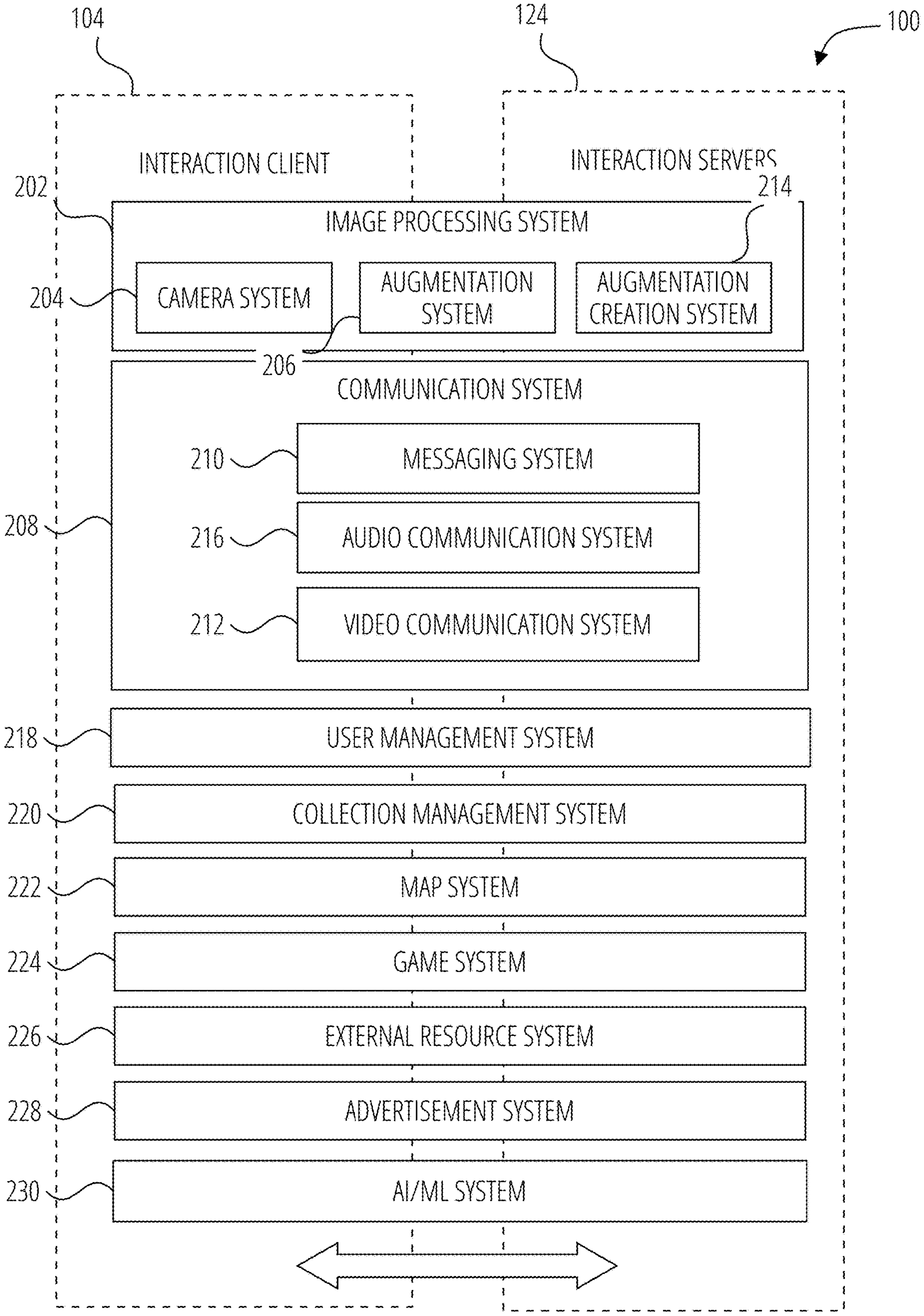
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of a microservice subsystem may include:

- Function logic: The function logic implements the functionality of the microservice subsystem, representing a specific capability or function that the microservice provides.
- API interface: Microservices may communicate with other component through well-defined APIs or interfaces, using lightweight protocols such as REST or messaging. The API interface defines the inputs and outputs of the microservice subsystem and how it interacts with other microservice subsystems of the interaction system 100.
- Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.
- Service discovery: Microservice subsystems may find and communicate with other microservice subsystems of the interaction system 100. Service discovery mechanisms enable microservice subsystems to locate and communicate with other microservice subsystems in a scalable and efficient way.
- Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 hosts a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
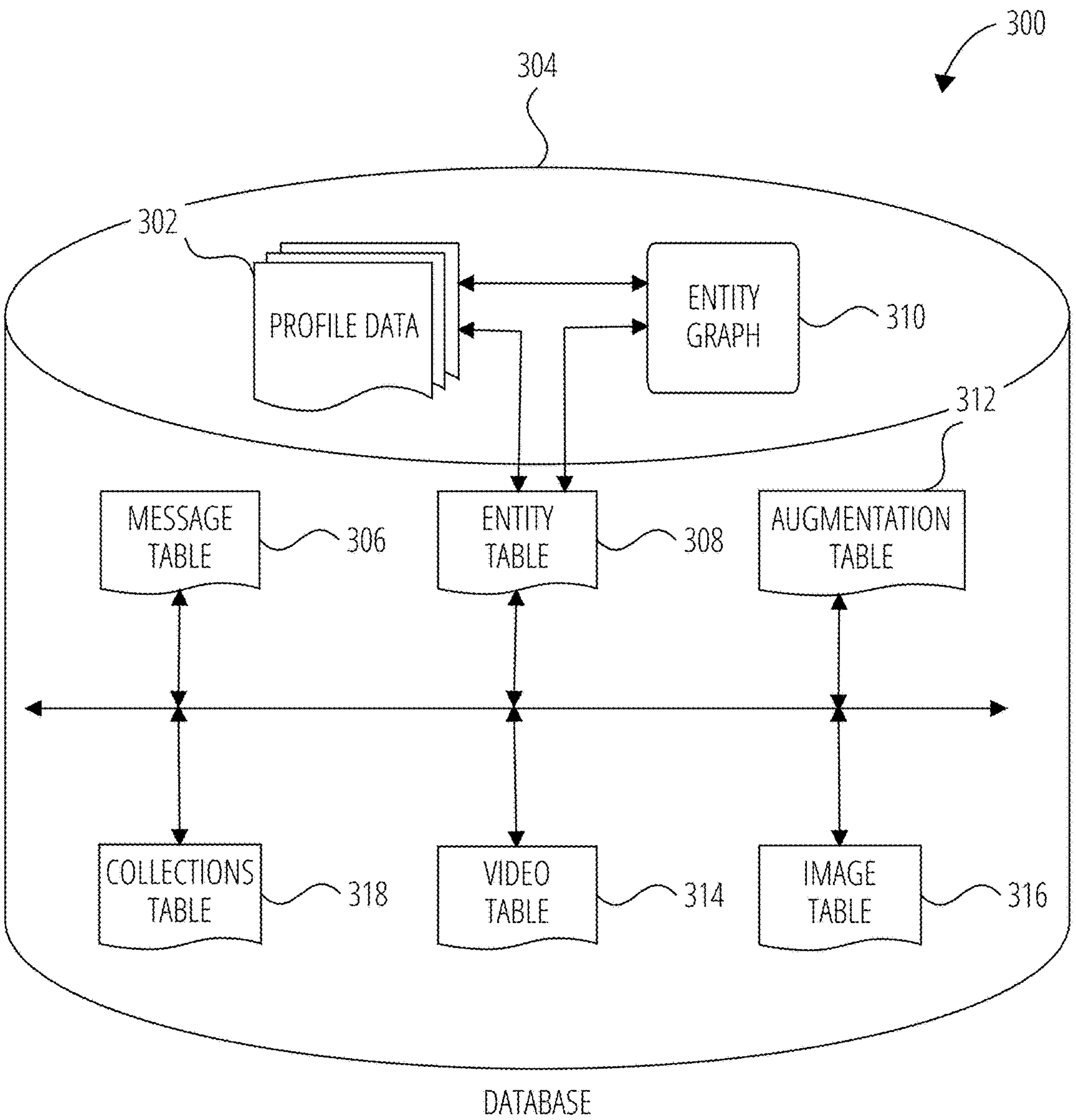
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database). In some cases, the database 304 includes features of or corresponds to database 128 in FIG. 1, and/or vice versa.

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated. Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

The system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, the system operating within the interaction client 104 determines the presence of a face within the image or video stream and provides modification icons associated with a computer animation model to transform image data, or the computer animation model can be present as associated with an interface described herein. The system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

Generating and Applying Textures Based on User Prompts

Figure 4:
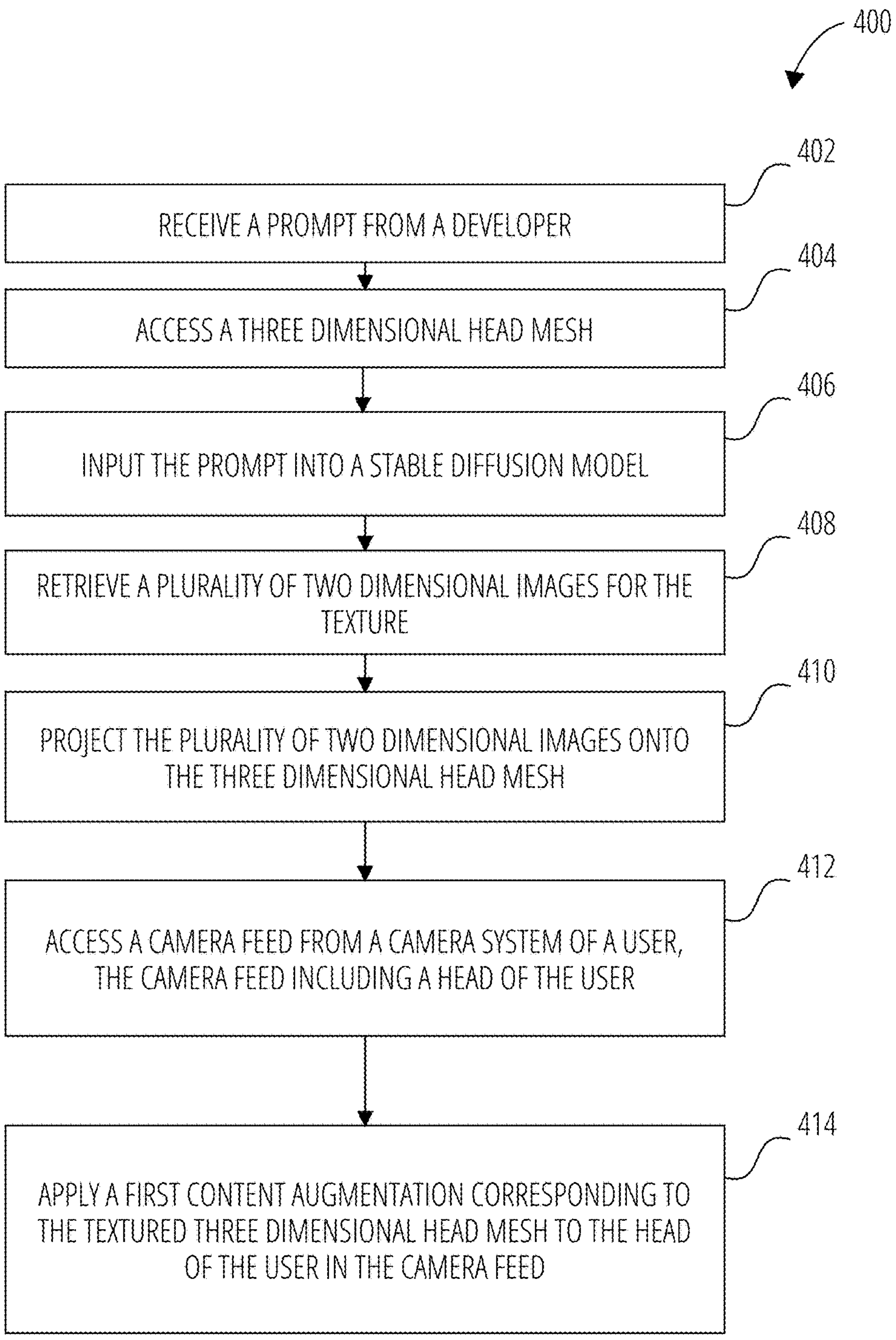
FIG. 4 illustrates a method in accordance with one embodiment.

FIG. 4 illustrates an example method 400 for generating and applying textures based on user prompts, according to some examples. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

FIG. 4 (and other figures herein) is described as being performed by certain systems or applying certain processes, such as a particular machine learning model or computer vision model, but the processes described herein can be performed by one or more other or the same machine learning models, computer vision models, or a combination thereof.

Extended Reality (XR) is an umbrella term encapsulating Augmented Reality (AR), Virtual Reality (VR), Mixed Reality (MR), and everything in between. For the sake of simplicity, examples are described using one type of system, such as XR or AR. However, it is appreciated that other types of systems apply.

Embodiments herein are described as being performed by a certain user, such as a user of a device or a developer. However, it is appreciated that features of embodiments can be performed by other users.

Embodiments herein are described as being performed for the generation of meshes, but it is appreciated that such features can also be applied to textures, and vice versa.

At operation 402, the interaction system receives a prompt from a developer. The prompt can be received directly from an input of the developer into a text box. In some cases, identifying the prompt for the developer includes receiving a question or request from the developer via text or speech. The interaction system identifies keywords from the prompt and applies weights to each of the identified keywords. The interaction system applies the identified keywords and corresponding weights to the second machine learning model.

At operation 404, the interaction system accesses a three dimensional head mesh. The head mesh can be a preconfigured mesh, a generated mesh, or a head mesh that is modified, such as a default head mesh. The default head mesh can include a geometric representation of a human head. This geometric representation is composed of vertices, edges, and features that define the surface of the head. These vertices are connected in a specific arrangement to form the shape of the head, including features such as the forehead, nose, eyes, mouth, and chin. The geometry of the default head mesh determines its overall shape and structure.

The topology of the default head mesh includes an arrangement of vertices, edges, and features and how they connect to form the surface of the head. Topology can include animation and/or deformation, and can influences how the mesh can be manipulated without introducing undesirable artifacts like stretching or tearing.

In addition to geometry, the default head mesh may also include texture coordinates. These coordinates define how textures are mapped onto the surface of the mesh. By assigning specific texture coordinates to each vertex of the mesh, textures such as skin tones, hair patterns, and facial features can be accurately applied, enhancing the realism of the model.

The default head mesh is rigged to the facial locations of a default head. The default head shows an image of a user's head with eyes, nose, mouth, and eyebrows. The default head mesh includes a mesh representing the default head, where the eyes, nose, mouth, and eyebrows of the default head mesh are in substantially the same location as in the default head.

Rigging in the context of mapping a default head mesh to the facial locations of a head can include associating the vertices of the mesh with specific points on the face. This association allows for the manipulation of the mesh to mimic the movements and expressions of the face.

In some cases, a skeletal structure is used, with bones representing the underlying structure of the character. In some cases for facial rigging, the rigging setup focuses on controlling specific facial features directly. The rigging process can involve defining control points or handles directly on the mesh. These control points can be referred to as joint clusters or control vertices. Each control point corresponds to a specific facial feature or region, such as the mouth, eyes, eyebrows, and jaw.

Starting with such a default head mesh that is already rigged to a default head of a user, the interaction system can maintain the rig between the head mesh and the head when changes are made to the mesh, as will be further described herein. As such, once changes to the mesh are made based on prompts and customized to a user's head and expressions, the user can move his or her head with various facial expressions, and the interaction system can apply the modified mesh to create animation that mimics the user's movements. The interaction system generates a textured three dimensional head mesh by applying a texture to the three dimensional head mesh.

At operation 406, the interaction system inputs the prompt into a stable diffusion model. The interaction system generates texture images based on a textual prompt provided by the developer. At this stage, the system utilizes a stable diffusion model, a type of generative model, to transform the textual prompt into visual content. The interaction system feeds the cleaned and processed prompt into the model.

A stable diffusion model includes a machine learning model designed to generate high-quality images from text descriptions. The model leverages advanced neural network architectures to interpret textual data and produce corresponding visual outputs. This model has been trained on a large dataset of images and associated text descriptions, enabling it to understand and generate a wide variety of textures and patterns based on the prompts it receives.

Before inputting the prompt into the stable diffusion model, the system ensures that the prompt is in a suitable format for the model's input requirements. The interaction system performs preprocessing steps, such as tokenization (breaking down the text into manage able units) and encoding (converting the text into a numerical format that the model can process).

The prompt, now tokenized and encoded, is fed into the input layer of the stable diffusion model. The model begins processing the input by passing it through multiple layers of the neural network. Each layer of the network performs complex computations, interpreting the semantic meaning of the text and mapping it to visual features. These layers are designed to handle various aspects of image generation, such as texture, color, and pattern recognition.

The stable diffusion model operates by iteratively refining the image generation process. It starts with a random noise image and gradually applies transformations guided by the input prompt. Through each iteration, the model reduces the noise and enhances the image, aligning it more closely with the textual description. This process continues until the generated image meets the model's criteria for quality and relevance to the prompt.

Once the stable diffusion model completes the generation process, it outputs one or more images that correspond to the textual prompt. These images are then retrieved by the interaction system for further processing, such as selection, refinement, or direct use in creating the textured 3D head mesh (which will be detailed in subsequent operations).

At operation 408, the interaction system retrieves a plurality of two dimensional images for the texture. After the prompt has been processed by the stable diffusion model to generate images, the interaction system retrieves these generated images. These images will be used to texture a three-dimensional (3D) head mesh.

Once the stable diffusion model completes the image generation process based on the input prompt, the model produces a set of 2D images. These images are stored in a temporary output buffer or a designated storage area within the interaction system.

At operation 410, the interaction system projects the plurality of two dimensional images onto the three dimensional head mesh. The purpose of this step is to take the retrieved two-dimensional (2D) images and map them onto a three-dimensional (3D) head mesh to create a realistic and cohesive texture.

In some cases, the interaction system applies UV mapping for projection where 2D texture coordinates (U, V) are assigned to the vertices of the 3D mesh. This creates a correspondence between the 2D images and the 3D geometry. The head mesh is unwrapped into a 2D space, creating a UV map. The 2D images are then applied to this map. The interaction system places each image onto the UV coordinates to ensure they cover the appropriate areas of the mesh. UV mapping allows precise control over how the textures are applied, making it possible to create detailed and seamless textures.

In some cases, the interaction system applies planar projection which involves projecting the 2D images onto the 3D mesh from a single plane, similar to shining a slide projector onto the mesh. The interaction system selects a projection plane (e.g., front, side) and projects the 2D images onto the head mesh. This technique is simple and effective for frontal or side views, making it ideal for initial texture placement.

In some cases, the interaction system applies cylindrical and/or spherical projection. Cylindrical projection wraps the 2D images around the mesh as if it were rolled around a cylinder. Spherical projection wraps the images around the mesh like a globe. The interaction system calculates the cylindrical or spherical coordinates for each vertex of the mesh. The 2D images are then projected onto the mesh based on these coordinates. The interaction system can apply this approach for rounded objects like heads, as they provide a more natural and continuous texture application.

In some cases, the interaction system applies normal mapping which involves using 2D images (normal maps) to simulate surface details without altering the mesh geometry. The interaction system generates normal maps from the 2D images and applies them to the 3D mesh. These maps modify the surface normals to create the illusion of depth and detail. Normal mapping enhances the visual detail of the mesh without increasing the polygon count, making it efficient for rendering.

In some cases, the interaction system applies texture baking which involves pre-computing the texture information and storing it directly on the mesh. The interaction system projects the 2D images onto the mesh and computes the final appearance, which is then baked into texture maps (diffuse, specular, etc.). These maps are directly applied to the mesh. The interaction system can apply this approach for consistent textures and reducing runtime computation, improving performance in real-time applications.

At operation 412, the interaction system accesses a camera feed from a camera system of a user, the camera feed including a head of the user. The interaction system obtains a real-time video feed from the user's camera, which includes capturing the user's head. This live feed will be used for applying the textured 3D head mesh and augmenting the user's appearance in real time. This operation is important for applications such as augmented reality (AR), virtual try-ons, or interactive virtual environments.

The user's device (e.g., smartphone, tablet, webcam, AR headset) includes a functioning camera capable of capturing video. The quality and resolution of the camera can affect the fidelity of the subsequent processes.

The interaction system requests and obtains permission from the user to access the camera. Once the camera feed is active, the interaction system employs face detection algorithms to locate the user's head within the video stream by identifying key facial features and the overall shape of the head. Continuous tracking ensures that the user's head is consistently monitored within the feed, even if the user moves.

The interaction system processes the video stream frame by frame. Each frame is an image that can be analyzed to detect and track the user's head. The camera feed is synchronized with other components of the interaction system, such as the textured 3D head mesh and the augmentation algorithms. The video frames are passed to the next stages of the pipeline, where the augmented content (e.g., the textured head mesh) will be applied to the detected head in the video feed.

At operation 414, the interaction system applies a first content augmentation corresponding to the textured three dimensional head mesh to the head of the user in the camera feed. The interaction system superimposes the textured 3D head mesh onto the user's head within the live camera feed, creating a real-time augmented reality (AR) experience. This involves aligning the virtual texture with the user's movements and expressions to ensure a seamless and realistic appearance.

The interaction system utilizes the face tracking data obtained from the previous operation to ensure that the textured 3D head mesh aligns accurately with the user's head. This includes tracking the position, orientation, and movements of the head in real time. The interaction system continuously updates the position and orientation of the 3D head mesh to match the user's movements.

The system maps the 3D coordinates of the head mesh to the 2D coordinates of the user's head in the camera feed by transforming the 3D mesh to fit the user's head shape and size accurately. The interaction system makes adjustments for rotation and scaling to ensure the mesh fits the head from various angles and distances.

The interaction system uses a rendering pipeline to overlay the textured 3D head mesh onto the live video feed by combining the 3D model with the 2D video frames in a visually cohesive manner. The edges of the 3D mesh are blended with the live video feed to avoid harsh transitions and make the augmentation appear seamless.

The interaction system can identify facial features from a camera feed by applying one or more computer vision techniques or machine learning models. The interaction system can apply face detection algorithms that analyze the pixels in the image to locate regions that likely contain faces. For example, the interaction system can apply facial detection where features such as color, texture, and shape are extracted. The machine learning algorithm analyzes the pixels in the image to identify regions that exhibit these characteristic features, which are likely to contain faces.

After detecting facial landmarks, the system extracts relevant features from the face, such as the shape of the eyes, the width of the mouth, the curvature of the eyebrows, etc. These features help characterize the unique facial structure of the individual. To ensure consistency across different faces and poses, the system may perform face alignment and normalization. This involves transforming the detected face region to a standard pose or orientation, such as aligning the eyes horizontally and normalizing the scale and rotation of the face.

After identifying the different locations of such facial features from the camera feed, the interaction system modifies the default head mesh to be a custom head mesh for the individual user. Once the interaction system has identified the locations of facial features in the camera feed, such as the positions of the eyes, nose, mouth, and other landmarks, the interaction system now possesses spatial information crucial for customizing the default head mesh.

The system establishes a correspondence between the detected facial features and corresponding regions on the default head mesh. For instance, the system maps the detected positions of the eyes to the eye regions of the default head mesh, the position of the nose to the nose region, and so forth. This mapping enables the system to accurately target specific areas of the default head mesh for modification.

Using techniques such as blendshapes or deformation fields, the interaction system deforms the default head mesh based on the detected facial features. For example, the system adjusts the weights of predefined blendshapes to match the positions and movements of the user's facial features. This results in the deformation of the default head mesh to resemble the user's facial structure. Alternatively, the system may utilize deformation fields, which are grids of vectors indicating how each point in the default head mesh should move to align with the detected facial features. These vectors are calculated based on the difference between the positions of the features in the camera feed and their corresponding positions on the default head mesh.

To ensure that the modified head mesh accurately reflects the individual user's facial features and expressions, the system performs fine-tuning and optimization techniques for iterative refinement of the deformation process, such as by comparing pre-adjustment meshes with post-adjustment meshes.

The interaction system can also use blendshapes to deform the default head mesh to match the expression of the user. The interaction system stores predefined configurations of a mesh that represent specific facial expressions or deformations. These configurations are created manually or generated algorithmically to capture various states of the mesh, such as smiles, frowns, raised eyebrows, etc.

The interaction system applies blendshapes using control sliders or weights associated with each expression. These sliders control the intensity or magnitude of each blendshape, allowing smooth interpolation between different expressions. The system maps the detected facial features to corresponding control sliders or blendshapes. For example, the position of the user's mouth corners might be mapped to a blendshape representing a smile, while the position of the eyebrows might be mapped to blendshapes representing raised or furrowed brows.

Based on the mapped facial features, the system adjusts the weights of the relevant blendshapes to match the user's facial expression. For example, if the user smiles, the system increases the weight of the smile blendshape, causing the mesh to deform accordingly. This adjustment is typically done through linear interpolation between blendshapes.

The adjusted mesh, deformed according to the user's facial expression, is rendered in real-time over the camera feed. The rendering process may involve techniques like texture mapping, lighting, and shading to ensure the mesh appears realistic and integrates seamlessly with the user's face in the camera feed.

The features of the embodiments described herein are described as being applied to a face. However, it is appreciated that such features can be applied to others, such as other parts of the body, the body, objects such as a chair or house, or the like.

The interaction system displays a selectable user interface element, such as a button, and in response to a user selection of the selectable user interface element, the interaction system captures a picture or video of the camera feed with the applied first content augmentation. The first content augmentation augments, modifies, or overlays content from the camera feed with one or more digital elements, such as a media content item. The media content items can include at least one of: an image, an animation, or audio.

The media content items include:

- Content augmentations to enhance images, videos, or other media content items to share with others, such as by adjusting the color or appearance or adding interactive elements such as animations and facial transformations, in real-time.
- Emojis that are small images or icons that represent emotions, reactions, or objects.
- Stickers are larger images or animations that can be sent in a chat window.
- Images or photographs can be sent to other users to share visual information or document a particular event.
- Video clips can be used to share recorded content or document a particular event.
- Audio messages can be shared to communicate audible communication.
- Graphics Interchange Formats (GIFs) are short animations that can be used to add humor or express emotions.

Systems and methods described herein include training a machine learning network, such as training to generate images from text prompts. The machine learning network can be trained to receive as input text prompts indicating a desired image, and the machine learning model is trained to generate such images in very high quality. The machine learning algorithm can be trained using historical information that include historical text prompts and historical images generated from said text prompts.

Training of models, such as artificial intelligence models, is necessarily rooted in computer technology, and improves modeling technology by using training data to train such models and thereafter applying the models to new inputs to make inferences on the new inputs. Here, the new inputs can be a new text prompt that was never seen by the machine learning model. The trained machine learning model can determine the intent of the prompt and generate corresponding images.

Such training involves complex processing that typically requires a lot of processor computing and extended periods of time with large training data sets, which are typically performed by massive server systems. Training of models can require logistic regression and/or forward/backward propagating of training data that can include input data and expected output values that are used to adjust parameters of the models. Such training is the framework of machine learning algorithms that enable the models to be applied to new and unseen data (such as new prompt data) and make predictions that the model was trained for based on the weights or scores that were adjusted during training. Such training of the machine learning models described herein reduces false positives and increases the performance of generating images, let alone gradients as described herein.

In some cases, the interaction system captures the initial texture of the user's face using high-resolution images or a 3D scanning system that provides a baseline texture map of the user's skin. The interaction system analyzes the texture to identify key features such as skin tone, wrinkles, pores, and other distinct facial details.

The interaction system identifies the features of the texture that need amplification (e.g., skin pores, wrinkles, blemishes) by texture segmentation and feature extraction techniques. The interaction system defines the parameters for amplifying these features, for example, by increasing the contrast, sharpness, or scale of the texture features to make them more pronounced.

The interaction system applies the amplification algorithm to the identified features by using image processing techniques such as high-pass filtering to enhance details or texture synthesis methods to exaggerate certain attributes. The interaction system maps the amplified texture back onto the 3D head mesh, ensuring the texture coordinates (UV mapping) align correctly to maintain realism.

The interaction system continuously updates the texture in real time to reflect any changes in the user's facial expressions or movements, ensuring that the amplified features remain consistent.

Overamplifying textures can make certain facial features stand out more, adding to the realism and expressiveness of the character or avatar. The level of texture amplification can be adjusted based on user preferences or specific application requirements.

In some cases, the interaction system captures the user's initial facial texture using high-resolution imaging or a 3D scanning system that provides a detailed texture map of the user's skin. The interaction system analyzes and processes the initial texture to create a baseline that can be morphed over time.

The interaction system generates the target texture based on the desired prompt using a stable diffusion model, where this texture incorporates stylistic elements specified in the prompt (e.g., fantasy elements, artistic styles). The interaction system ensures the target texture is compatible with the mesh and can be seamlessly mapped.

The interaction system can calculate a series of intermediate textures that transition smoothly from the initial texture to the target texture by generating a blend of textures that gradually incorporate elements of the target style. The interaction system uses techniques such as linear interpolation or more sophisticated texture blending methods to create these intermediate textures.

The interaction system applies the intermediate textures to the 3D head mesh in real time, adjusting the texture coordinates (UV mapping) as needed to maintain alignment. The interaction system implements a control system that adjusts the morphing factor from 0 (initial texture) to 1 (target texture), which can be time-based or controlled by user input, allowing for smooth transitions.

The interaction system can ensure the morphed textures respond correctly to facial expressions and movements by updating the texture mapping in real time to match the user's facial dynamics. The interaction system can implement techniques to ensure that the texture transitions are smooth and natural, avoiding abrupt changes or artifacts.

Slow morphing of textures creates a visually engaging effect, showing a gradual transformation that can enhance storytelling or character development in applications such as gaming and animation. The interaction system allows users to see a progressive change in their appearance, enhancing immersion and personalization in virtual environments.

Overamplifying textures involves capturing the initial texture of the user's face, applying an amplification algorithm to enhance specific features, and mapping the amplified texture back onto the 3D head mesh. This enhances detail and can be customized for various applications. Slow morphing of textures involves capturing the initial texture, generating a target texture based on a prompt, calculating intermediate textures, and applying these in real time to create a smooth transition from the initial to the target texture. Both techniques offer unique ways to enhance the visual richness and interactivity of 3D head meshes in various digital applications.

The interaction system can apply an intermediary image and/or derived characteristics to a stable diffusion model to generate 2D images for projection onto a 3D head mesh. The user provides a text prompt that describes the desired characteristics of the texture. For instance, a user might input "glowing tribal patterns with green and gold hues."

Using this text prompt, the interaction system applies a text-to-image model or a diffusion model to create an initial 2D image that reflects the described features. This image serves as a visual representation of the text prompt and provides a starting point for further processing.

Once the initial image is generated, the interaction system can extract features by analyzing the image by identifying key elements such as color patterns, shapes, textures, and other stylistic attributes. The interaction system can apply convolutional neural networks to extract high-level features from the image. These features might include edge detection, texture mapping, color histograms, and more detailed stylistic elements like specific patterns or motifs present in the image.

The generated image and/or the extracted features is then fed into a stable diffusion model. The stable diffusion model is trained to generate new images based on the input image and its features, ensuring that the generated textures remain consistent with the desired style.

By using both the image and the extracted features, the stable diffusion model can create multiple 2D images that maintain the visual coherence of the initial image while introducing variations and enhancements. This step ensures that the final textures are rich and detailed, suitable for projection onto the 3D mesh.

The stable diffusion model generates a plurality of 2D images based on the initial image prompt and its features. These images are variations that collectively represent the texture needed for the 3D head mesh.

The interaction system then projects these generated 2D images onto the 3D head mesh, such as via UV mapping, cylindrical projection, or planar projection (as further described herein).

During application, the system can make real-time adjustments to the textures to ensure they conform to the mesh's geometry and any dynamic movements or expressions of the user's face. This ensures that the augmented reality experience remains seamless and realistic.

By leveraging an initial text prompt to generate a representative image, and then extracting features from this image to guide further image generation with a stable diffusion model, the process ensures that the final 2D textures are both visually rich and stylistically coherent. These generated textures can then be effectively projected onto a 3D head mesh, creating realistic and engaging visual effects for various applications such as gaming, virtual reality, and character customization.

In some cases, the interaction system receives an image from the user and inputs the image into a stable diffusion model to generate more images. The additional images are used to project onto the mesh. In some cases, the interaction system receives an image from the user and identifies a prompt for the user, and inputs both the image and the prompt into a stable diffusion model to generate more images. The additional images are used to project onto the mesh.

In some cases, the mesh can include implicit or explicit surfaces, fields, grids, pointclouds, gaussian or other splatting, implicit or explicit maps, or the like.

In some cases, the interaction system can apply a depth map along with an image to the stable diffusion model to generate 2D textures. The interaction system first captures or generates a depth map of the user's face. A depth map is a grayscale image where each pixel value represents the distance from the camera, providing a 3D profile of the face's surface.

Alongside the depth map, the system uses a corresponding 2D image of the user's face. This image provides the color and texture information that, when combined with the depth map, offers a comprehensive representation of the user's facial features.

These two inputs—depth map and image—are then combined to enhance the understanding of the face's 3D structure. The depth map adds dimensional context to the flat image, allowing for more accurate and realistic texture generation.

The stable diffusion model is configured to accept both the depth map and the 2D image as inputs. This dual input approach helps the model understand not only the texture and color details but also the 3D spatial information provided by the depth map.

The model processes the depth map to extract geometric features of the face, such as contours and depth variations. Simultaneously, the model processes the 2D image to capture color patterns, textures, and other visual details.

By leveraging both sets of data, the stable diffusion model generates a set of 2D images that accurately reflect the 3D structure and texture of the face. The depth map ensures that these textures conform to the face's geometric features, while the image data ensures realistic color and texture detail.

By using a depth map in conjunction with a 2D image, the stable diffusion model can produce highly detailed and accurate textures that take into account both the surface geometry and the visual appearance of the face. This approach enables the generation of 2D textures that are not only visually rich but also spatially coherent, resulting in more realistic and immersive applications in augmented reality, virtual reality, and other 3D modeling contexts.

3D Mesh with Texture

Figure 6:
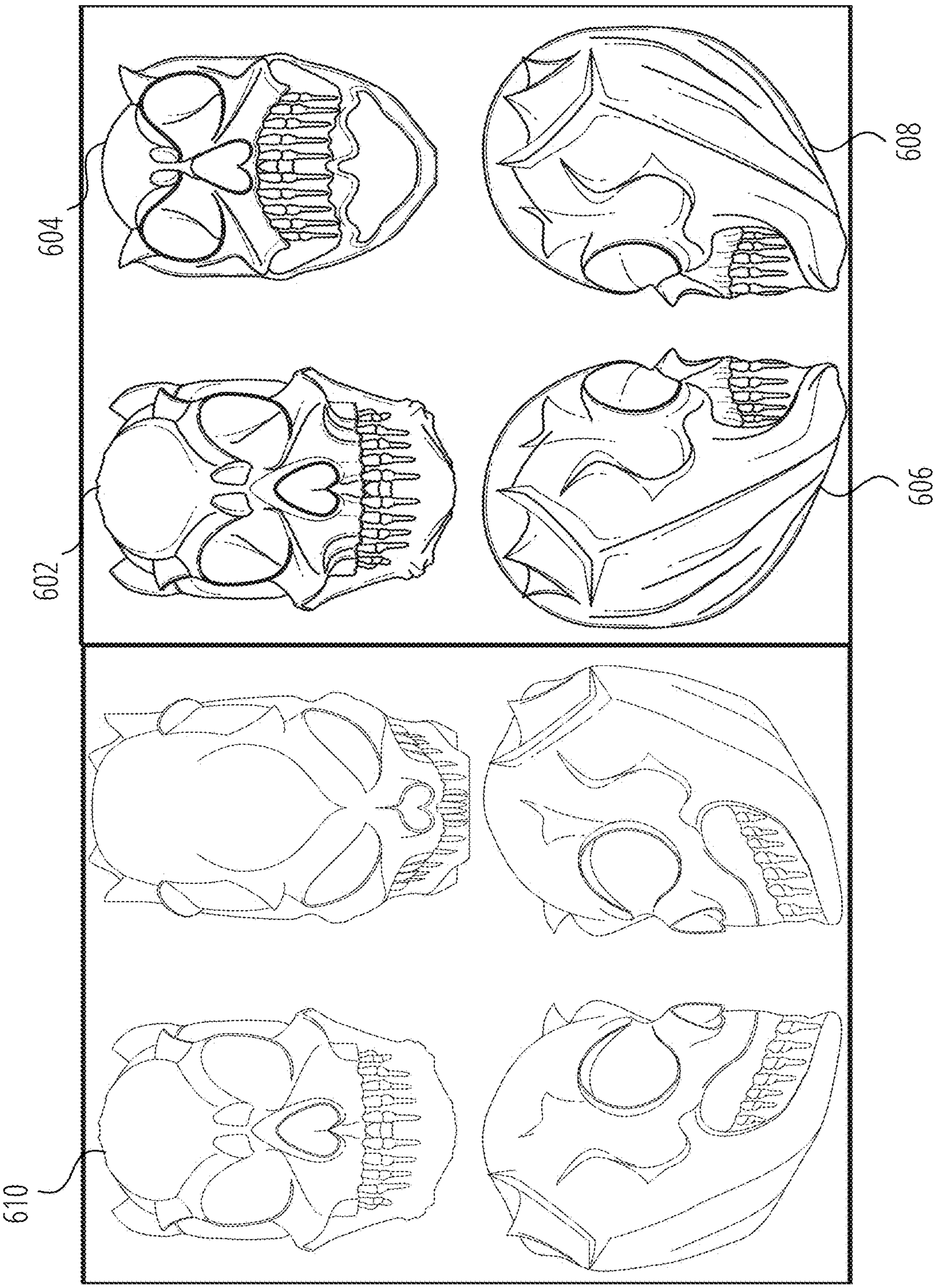
FIG. 6 illustrates the generation of texture to be projected onto a 3D mesh, according to some examples.

FIG. 6 illustrates the generation of texture to be projected onto a 3D mesh, according to some examples. In some cases, the interaction system applies a stable diffusion model to generate multiple 2D views of a texture based on text prompts, such as a texture front view 602, a texture bottom view 604, a texture left view 606, and a texture right view 608. Then, the interaction system can project these views onto a 3D mesh to create a textured 3D representation.

The interaction system can generate a 3D mesh using photogrammetry by taking multiple photographs of a user's head from different angles and reconstructing the mesh to generate a 3D model, using 3D scanning using laser or light scanners to capture the shape and detail of the head, depth cameras to capture depth information used to create the 3D model, or other methods for the generation of the 3D mesh.

Figure 5:
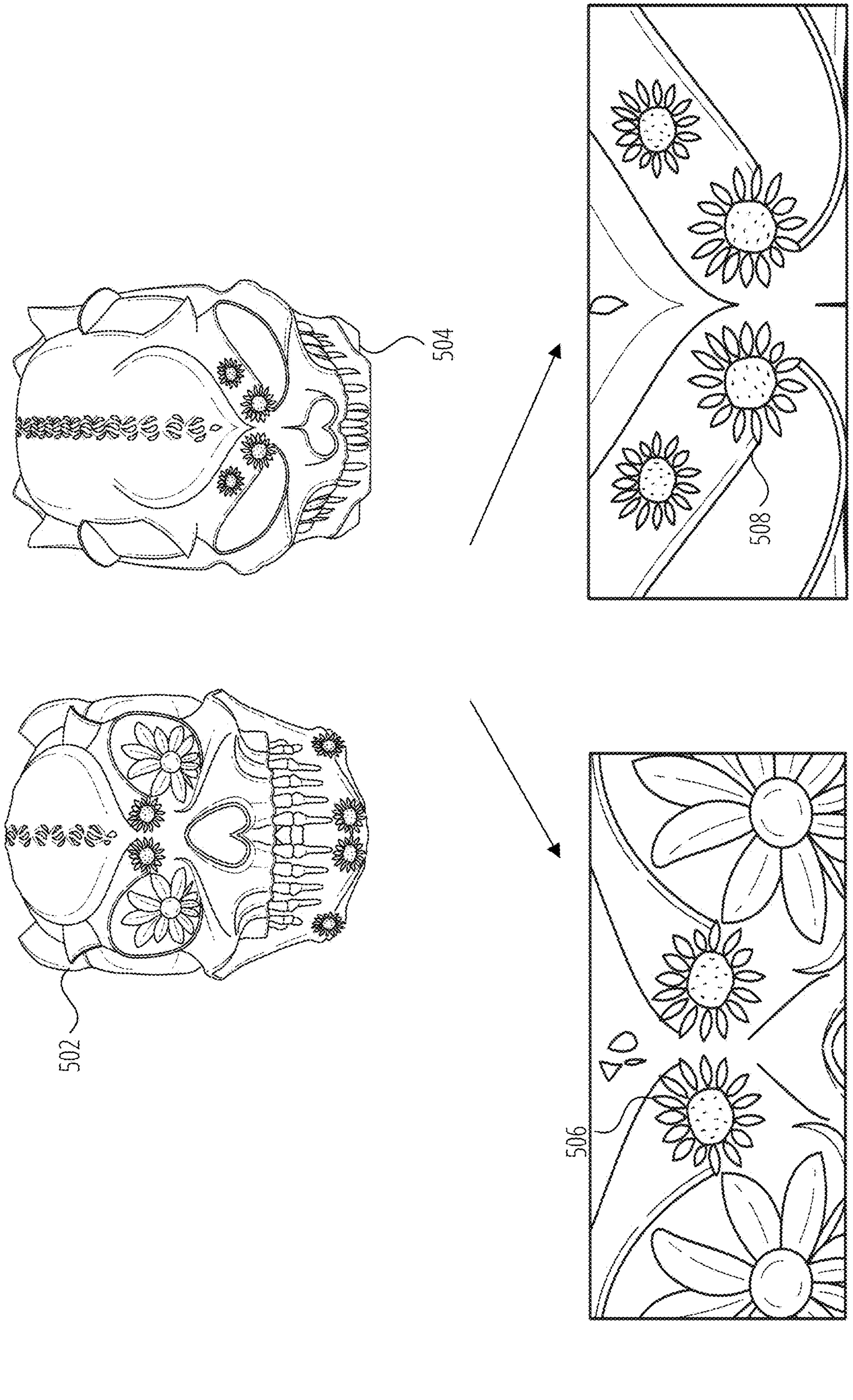
FIG. 5 illustrates inconsistencies in generated texture views according to some examples.

In some cases, the interaction system uses the default head mesh that is rigged to a default head and modifies the mesh as described in FIGS. 4-5, where the modified mesh maintains the rigging between the default head mesh and the default head.

Utilizing stable diffusion models, the interaction system generates multiple 2D views of a texture based on textual inputs. These views represent different aspects or variations of the texture as described by the text prompts. Each generated view corresponds to a specific configuration or appearance of the texture.

Once the 2D views of the texture are generated, the system projects these views onto the surface of the 3D mesh. This projection process involves mapping the pixels from each 2D view onto the corresponding vertices or faces of the 3D mesh, aligning them appropriately to ensure that the texture conforms to the geometry of the mesh.

As the 2D views are projected onto the 3D mesh, the interaction system ensures proper alignment and wrapping of the texture around the surface of the mesh by determining how each pixel from the 2D views corresponds to specific regions or coordinates on the surface of the mesh.

In certain examples, the interaction system applies greater weighting for certain pixels or features (e.g., facial features) depending on the type of view. For example, the nose from the front view may be given greater weight than the nose generated from a side view, and thus the interaction system may apply the nose from the front view onto the 3D mesh.

To create a cohesive and seamless texture across the surface of the 3D mesh, the interaction system can apply blending at the boundaries between adjacent texture projections. This helps to smooth out any discontinuities or seams that may arise from the projection process, ensuring a visually appealing result.

By generating multiple 2D views of the texture, the system ensures that all aspects and variations of the texture described by the text prompts are captured and represented on the 3D mesh. This comprehensive approach enhances the realism and richness of the textured 3D representation.

Once the texture projections are applied to the 3D mesh, the textured model can be rendered and visualized in various applications or environments. This allows users to interact with and explore the textured 3D representation, experiencing the texture variations specified by the text prompts in a realistic and immersive manner.

In some cases, a depth map, such as a depth map 610, is provided by the interaction system to the stable diffusion model in order to generate the textures. In other cases, the stable diffusion model generates the depth map based on a default head mesh as well as the textures for each of the views.

FIG. 5 illustrates inconsistencies in generated texture views according to some examples. When generating multiple 2D views of a texture based on text prompts using stable diffusion models, inconsistencies between views can arise due to various factors such as the interpretation of the text, the stochastic nature of the generation process, or the complexity of the texture itself.

Text prompts may be interpreted differently by the stable diffusion model, leading to variations in the generated 2D views. For example, a prompt describing "flowers near the eyes" may be interpreted in various ways, resulting in different arrangements or quantities of flowers in the generated views. For example, the front view 502 of a skull includes two flowers 506, whereas a top view 504 of the skull includes four flowers 508.

The interaction system incorporates stochasticity or randomness in the generation process, resulting in slight variations between generated views even for the same input text prompt. This randomness can lead to inconsistencies in the appearance of the texture across different views, especially when dealing with complex or detailed textures.

For projecting these views onto a 3D mesh, certain views may be given higher weighting or prioritization for specific regions of the mesh. For example, a front view generated by the stable diffusion model may be weighted more heavily for the eyes and nose region, while a top view may be prioritized for the forehead or crown area. This weighting can influence the final appearance of the texture on the 3D mesh. As such, the final 3D mesh with the added texture may include the two flowers, since the two flowers are closer to the nose and eye region, thus giving more weight to the front view, rather than the top view.

Different views generated by the stable diffusion model may vary in resolution or level of detail, leading to inconsistencies in the appearance of fine-grained features such as flowers or patterns. Views with higher resolution or finer detail may reveal additional elements or nuances in the texture that are not present in views with lower resolution and thus may be provided more weighting.

In some cases, to address inconsistencies between views, the interaction system may blend and harmonize the views by smoothing out discrepancies and ensure a coherent and visually pleasing texture across the surface of the 3D mesh, taking into account the weighting and prioritization assigned to each view.

Inconsistencies between views of a texture generated by stable diffusion models can arise due to semantic interpretation, the stochastic nature of generation, weighting and prioritization, resolution and detail level differences, and blend and harmonization techniques applied during texture projection. Despite these inconsistencies, weighting and prioritization mechanisms can help ensure that the final texture applied to the 3D mesh reflects the desired characteristics specified by the input text prompts.

To iteratively smoothing out the 3D mesh, the interaction system applies a denoising technique. The interaction system takes 2D images of random views of the mesh, adds noise to the 2D view, denoises the 2D view, and then projects these denoised images back onto the 3D mesh.

The interaction system selects random views of the 3D mesh from various angles or perspectives. These views provide different vantage points of the mesh's surface and may exhibit varying levels of noise or irregularities.

From each selected view, the system extracts a 2D image representing the mesh's appearance from that viewpoint. This image captures the visual characteristics and details of the mesh as seen from the chosen perspective.

To introduce variability and simulate imperfections in the captured images, the system adds noise to the extracted 2D images. Noise can manifest as random fluctuations in pixel values, resembling graininess or artifacts commonly observed in digital images.

Following noise addition, the system applies denoising to the noisy 2D images which removes or reduces the undesirable effects of noise while preserving important details and features present in the images.

After denoising, the system projects the denoised 2D images back onto the 3D mesh. This projection process involves mapping the pixels from each denoised image onto the corresponding vertices or faces of the mesh, effectively updating the geometry and appearance of the mesh based on the denoised views.

The interaction system is repeated iteratively for multiple random views of the mesh. Each iteration involves selecting a random view, adding noise, denoising the image, and projecting it back onto the 3D mesh. By performing this sequence of operations multiple times, the system progressively smooths out the entire 3D mesh surface.

The iterative smoothing process continues until a desired level of smoothness or convergence is achieved. This may involve monitoring metrics related to mesh quality or appearance and adjusting parameters of the denoising algorithm or projection technique to optimize smoothing performance.

To support real-time applications or interactive experiences, the system optimizes the smoothing process for efficiency and responsiveness. Techniques such as parallelization, optimization algorithms, or hardware acceleration may be employed to accelerate computation and minimize latency.

The interaction system iteratively smoothing out the 3D mesh by adding noise to 2D images of random views, denoising these images, and projecting them back onto the mesh. This iterative smoothing approach helps improve the overall quality and appearance of the 3D mesh surface, enhancing its realism and visual appeal.

3D Mask Generation from 2D Rendered Image

Figure 7:
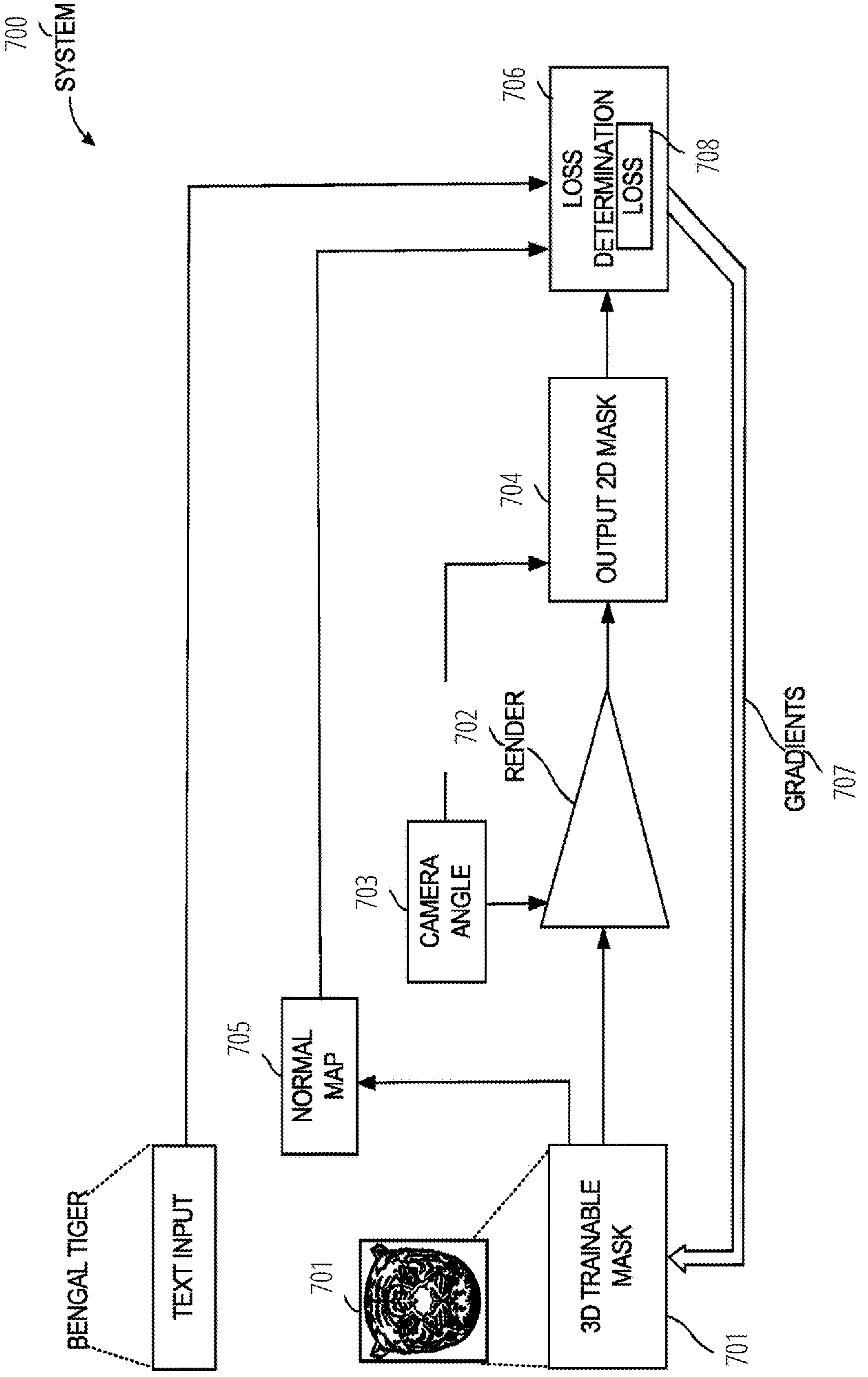
FIG. 7 illustrates a system for 3D mesh generation, in accordance with some examples.

FIG. 7 illustrates a system 700 for 3D mask (e.g., texture) generation, in accordance with some examples. The interaction system adjusts the geometry of the 3D trainable mask 701 by iterating the following operations one or more times. The interaction system renders 702 output 2D mask 704 from the 3D trainable mask, a camera angle 703, and, optionally, lighting information. The example 3D trainable mask 701 is a plain mask with the Bengal tiger texture. The interaction system determines the normal map 705 from the 3D trainable mask. The normal map 705 is composed of distances from the surface of the 3D trainable mask to a normal plain defined by the geometry of the 3D trainable mask. The interaction system selects different camera angles 703 and/or lighting information during different iterations of training to include a variety of camera angles 703 to train the 3D trainable mask.

After rendering the output 2D mask 704, the interaction system determines the gradients 707 based on the loss 708 from a loss determination module 706. The interaction system backpropagates or propagates the gradients 707 to update the geometry of the 3D trainable mask. The interaction system repeats these operations until the loss 708 transgresses or is below a threshold value, in accordance with some examples. In some examples, the interaction system performs these operations a predetermined number of times. In some examples, the interaction system performs these operations for a fixed amount of time to support a real-time video application that places the 3D trainable mask on a face of a user.

The interaction system iteratively adjusts the geometry of a 3D trainable mask based on rendering the mask as a 2D image, computing loss, determining adjustments, and propagating gradients back to the 3D representation. The interaction system renders the 3D trainable mask into a 2D image based on a given camera angle and, optionally, lighting information. This involves projecting the 3D geometry onto a 2D plane to create a realistic image of the mask from the specified viewpoint.

After rendering the 3D mask into a 2D image, the system computes a loss function that measures the discrepancy between the rendered image and the desired output. This loss function quantifies how well the rendered image matches the target image or desired characteristics, such as fidelity to the original mask or alignment with the user's facial features.

Using the computed loss, the system determines how the geometry of the 3D trainable mask should be adjusted to minimize the loss and improve the alignment with the desired output. This adjustment may involve modifying the positions of vertices, adjusting texture mapping, or changing other parameters of the mask.

The interaction system backpropagates or propagates gradients computed from the loss function to update the geometry of the 3D trainable mask. Gradients indicate the direction and magnitude of adjustments needed to minimize the loss. By propagating these gradients back to the 3D representation of the mask, the system can iteratively refine its geometry to better match the desired output.

The interaction system repeats these operations iteratively, adjusting the geometry of the 3D mask based on the computed gradients and re-rendering it into a 2D image to compute loss. This iterative optimization process continues until the loss converges to a satisfactory level or falls below a predefined threshold. This ensures that the geometry of the 3D mask progressively improves to better match the desired output or target image.

The interaction system iteratively adjusts the geometry of a 3D trainable mask based on rendering it into a 2D image, computing loss, determining adjustments, and propagating gradients back to the 3D representation. This iterative optimization process enables the system to refine the geometry of the mask to better align with the desired output, such as accurately representing facial features in real-time video applications.

Data Communications Architecture

Figure 8:
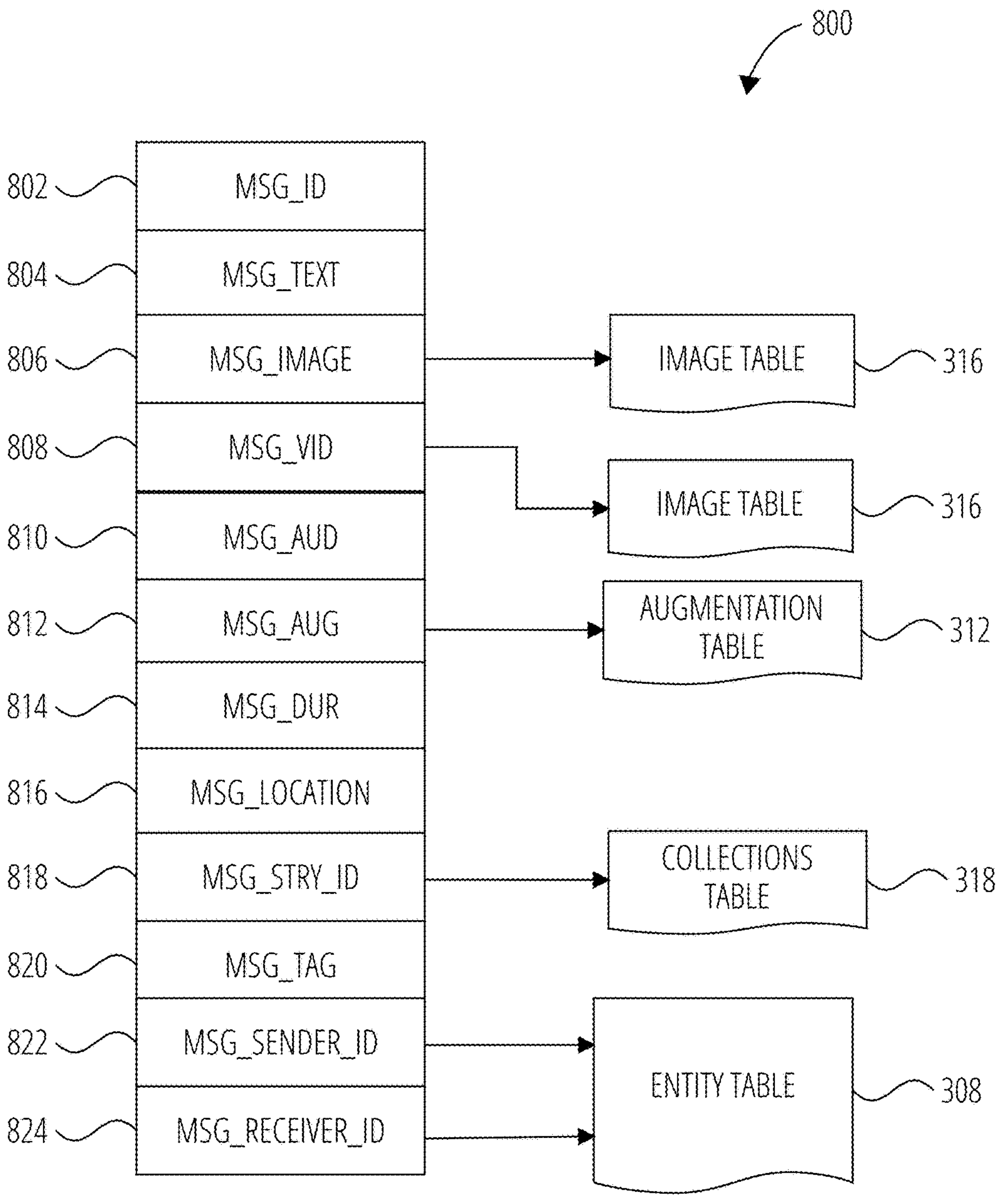
FIG. 8 is a diagrammatic representation of a message, according to some examples.

FIG. 8 is a schematic diagram illustrating a structure of a message 800, according to some examples, generated by an interaction client 104 for communication to a further interaction client 104 via the interaction servers 124. The content of a particular message 800 is used to populate the message table 306 stored within the database 304, accessible by the interaction servers 124. Similarly, the content of a message 800 is stored in memory as "in-transit" or "in-flight" data of the user system 102 or the interaction servers 124. A message 800 is shown to include the following example components:

- Message identifier 802: a unique identifier that identifies the message 800.
- Message text payload 804: text, to be generated by a user via a user interface of the user system 102, and that is included in the message 800.
- Message image payload 806: image data, captured by a camera component of a user system 102 or retrieved from a memory component of a user system 102, and that is included in the message 800. Image data for a sent or received message 800 may be stored in the image table 316.
- Message video payload 808: video data, captured by a camera component or retrieved from a memory component of the user system 102, and that is included in the message 800. Video data for a sent or received message 800 may be stored in the image table 316.
- Message audio payload 810: audio data, captured by a microphone or retrieved from a memory component of the user system 102, and that is included in the message 800.
- Message augmentation data 812: augmentation data (e.g., filters, stickers, or other annotations or enhancements) that represents augmentations to be applied to message image payload 806, message video payload 808, or message audio payload 810 of the message 800. Augmentation data for a sent or received message 800 may be stored in the augmentation table 312.
- Message duration parameter 814: parameter value indicating, in seconds, the amount of time for which content of the message (e.g., the message image payload 806, message video payload 808, message audio payload 810) is to be presented or made accessible to a user via the interaction client 104.
- Message geolocation parameter 816: geolocation data (e.g., latitudinal and longitudinal coordinates) associated with the content payload of the message. Multiple message geolocation parameter 816 values may be included in the payload, each of these parameter values being associated with respect to content items included in the content (e.g., a specific image within the message image payload 806, or a specific video in the message video payload 808).
- Message story identifier 818: identifier values identifying one or more content collections (e.g., "stories" identified in the collections table 318) with which a particular content item in the message image payload 806 of the message 800 is associated. For example, multiple images within the message image payload 806 may each be associated with multiple content collections using identifier values.
- Message tag 820: each message 800 may be tagged with multiple tags, each of which is indicative of the subject matter of content included in the message payload. For example, where a particular image included in the message image payload 806 depicts an animal (e.g., a lion), a tag value may be included within the message tag 820 that is indicative of the relevant animal. Tag values may be generated manually, based on user input, or may be automatically generated using, for example, image recognition.
- Message sender identifier 822: an identifier (e.g., a messaging system identifier, email address, or device identifier) indicative of a user of the user system 102 on which the message 800 was generated and from which the message 800 was sent.
- Message receiver identifier 824: an identifier (e.g., a messaging system identifier, email address, or device identifier) indicative of a user of the user system 102 to which the message 800 is addressed.

The contents (e.g., values) of the various components of message 800 may be pointers to locations in tables within which content data values are stored. For example, an image value in the message image payload 806 may be a pointer to (or address of) a location within an image table 316. Similarly, values within the message video payload 808 may point to data stored within an image or video table 316, values stored within the message augmentation data 812 may point to data stored in an augmentation table 312, values stored within the message story identifier 818 may point to data stored in a collections table 318, and values stored within the message sender identifier 822 and the message receiver identifier 824 may point to user records stored within an entity table 308.

System with Head-Wearable Apparatus

Figure 9:
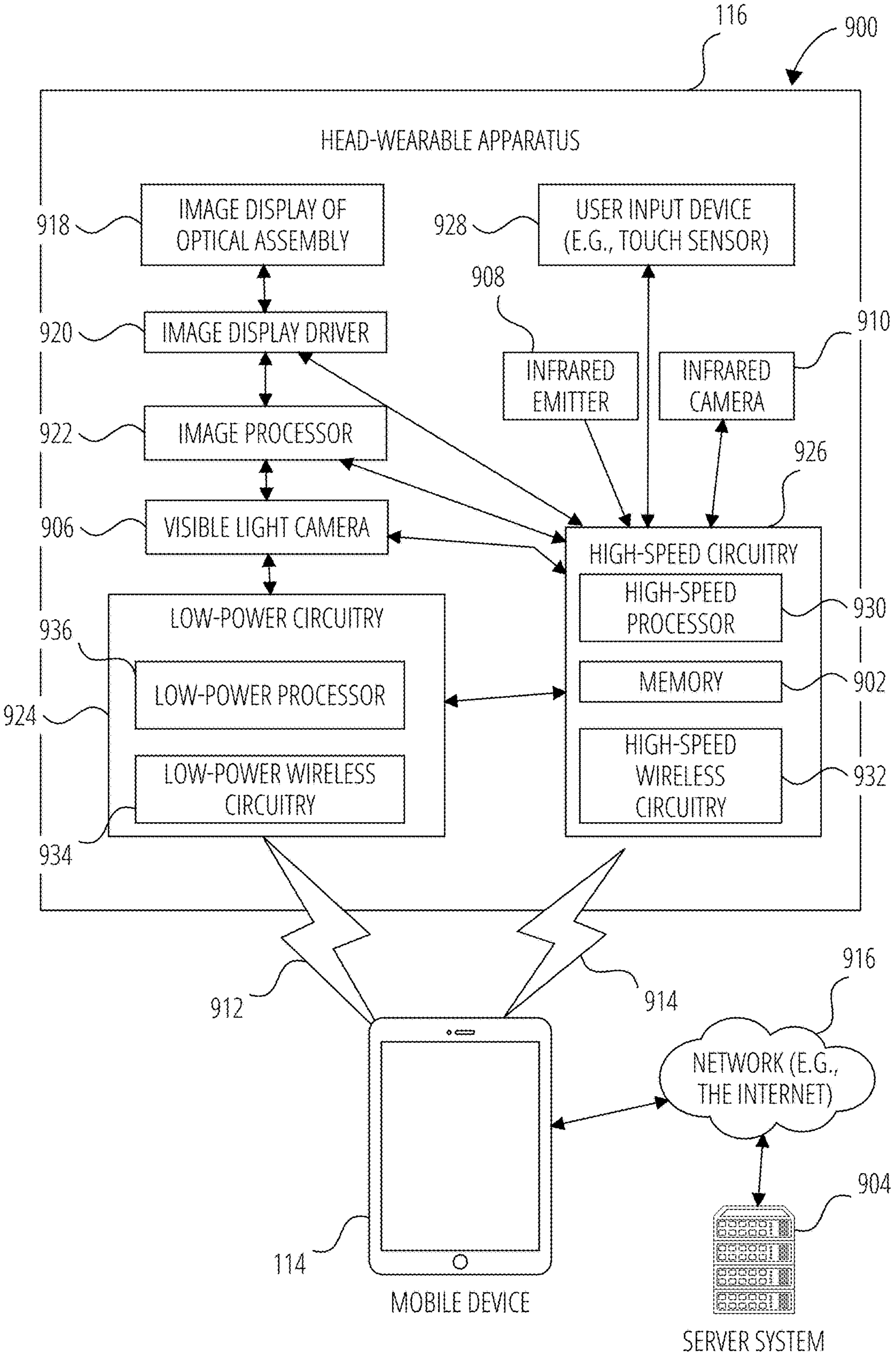
FIG. 9 illustrates a system including a head-wearable apparatus with a selector input device, according to some examples.

FIG. 9 illustrates a system 900 including a head-wearable apparatus 116 with a selector input device, according to some examples. FIG. 9 is a high-level functional block diagram of an example head-wearable apparatus 116 communicatively coupled to a mobile device 114 and various server systems 904 (e.g., the interaction server system 110) via various networks 108. The networks 108 may include any combination of wired and wireless connections.

The head-wearable apparatus 116 includes one or more cameras, each of which may be, for example, a visible light camera 906, an infrared emitter 908, and an infrared camera 910.

An interaction client, such as a mobile device 114 connects with head-wearable apparatus 116 using both a low-power wireless connection 912 and a high-speed wireless connection 914. The mobile device 114 is also connected to the server system 904 and the network 916.

The head-wearable apparatus 116 further includes two image displays of the image display of optical assembly 918. The two image displays of optical assembly 918 include one associated with the left lateral side and one associated with the right lateral side of the head-wearable apparatus 116. The head-wearable apparatus 116 also includes an image display driver 920, an image processor 922, low-power circuitry 924, and high-speed circuitry 926. The image display of optical assembly 918 is for presenting images and videos, including an image that can include a graphical user interface to a user of the head-wearable apparatus 116.

The image display driver 920 commands and controls the image display of optical assembly 918. The image display driver 920 may deliver image data directly to the image display of optical assembly 918 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 928 (e.g., touch sensor or push button), including an input surface on the head-wearable apparatus 116. The user input device 928 (e.g., touch sensor or push button) is to receive from the user an input selection to manipulate the graphical user interface of the presented image.

The components shown in FIG. 9 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 906 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 902, which stores instructions to perform a subset or all of the functions described herein. The memory 902 can also include storage device.

As shown in FIG. 9, the high-speed circuitry 926 includes a high-speed processor 930, a memory 902, and high-speed wireless circuitry 932. In some examples, the image display driver 920 is coupled to the high-speed circuitry 926 and operated by the high-speed processor 930 in order to drive the left and right image displays of the image display of optical assembly 918. The high-speed processor 930 may be any processor capable of managing high-speed communications and operation of any general computing system needed for the head-wearable apparatus 116. The high-speed processor 930 includes processing resources needed for managing high-speed data transfers on a high-speed wireless connection 914 to a wireless local area network (WLAN) using the high-speed wireless circuitry 932. In certain examples, the high-speed processor 930 executes an operating system such as a LINUX operating system or other such operating system of the head-wearable apparatus 116, and the operating system is stored in the memory 902 for execution. In addition to any other responsibilities, the high-speed processor 930 executing a software architecture for the head-wearable apparatus 116 is used to manage data transfers with high-speed wireless circuitry 932. In certain examples, the high-speed wireless circuitry 932 is configured to implement Institute of Electrical and Electronic Engineers (IEEE) 802.11 communication standards, also referred to herein as WI-FI®. In some examples, other high-speed communications standards may be implemented by the high-speed wireless circuitry 932.

The low-power wireless circuitry 934 and the high-speed wireless circuitry 932 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 912 and the high-speed wireless connection 914, may be implemented using details of the architecture of the head-wearable apparatus 116, as can other elements of the network 916.

The memory 902 includes any storage device capable of storing various data and applications, including, among other things, camera data generated by the left and right visible light cameras 906, the infrared camera 910, and the image processor 922, as well as images generated for display by the image display driver 920 on the image displays of the image display of optical assembly 918. While the memory 902 is shown as integrated with high-speed circuitry 926, in some examples, the memory 902 may be an independent standalone element of the head-wearable apparatus 116. In certain such examples, electrical routing lines may provide a connection through a chip that includes the high-speed processor 930 from the image processor 922 or the low-power processor 936 to the memory 902. In some examples, the high-speed processor 930 may manage addressing of the memory 902 such that the low-power processor 936 will boot the high-speed processor 930 any time that a read or write operation involving memory 902 is needed.

As shown in FIG. 9, the low-power processor 936 or high-speed processor 930 of the head-wearable apparatus 116 can be coupled to the camera (visible light camera 906, infrared emitter 908, or infrared camera 910), the image display driver 920, the user input device 928 (e.g., touch sensor or push button), and the memory 902.

The head-wearable apparatus 116 is connected to a host computer. For example, the head-wearable apparatus 116 is paired with the mobile device 114 via the high-speed wireless connection 914 or connected to the server system 904 via the network 916. The server system 904 may be one or more computing devices as part of a service or network computing system, for example, that includes a processor, a memory, and network communication interface to communicate over the network 916 with the mobile device 114 and the head-wearable apparatus 116.

The mobile device 114 includes a processor and a network communication interface coupled to the processor. The network communication interface allows for communication over the network 916, low-power wireless connection 912, or high-speed wireless connection 914. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 920. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 904, such as the user input device 928, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 912 and high-speed wireless connection 914 from the mobile device 114 via the low-power wireless circuitry 934 or high-speed wireless circuitry 932.

Machine Architecture

Figure 10:
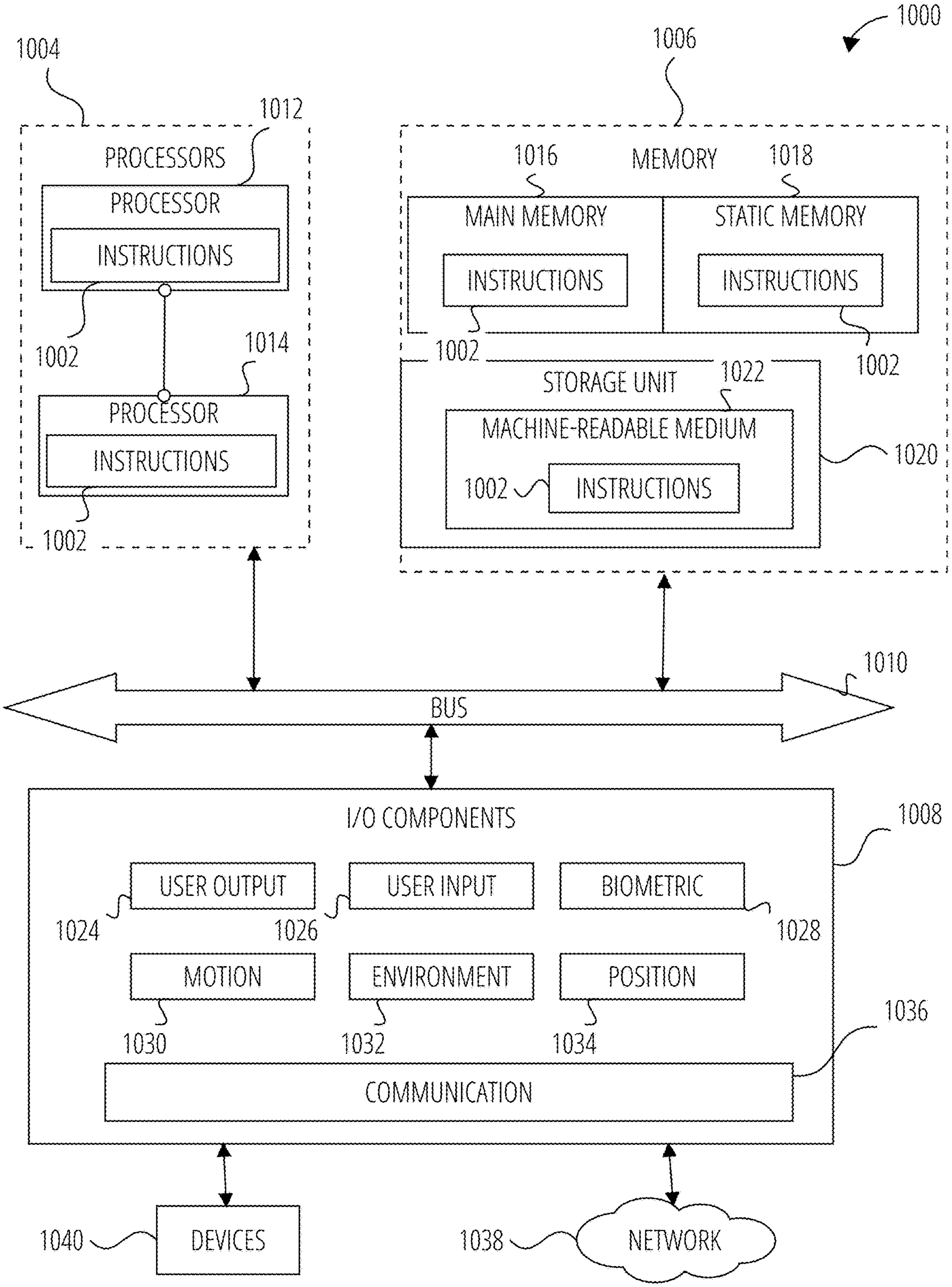
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1030 include acceleration sensor components (e.g., accelerometer), gravitation sensor components, rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
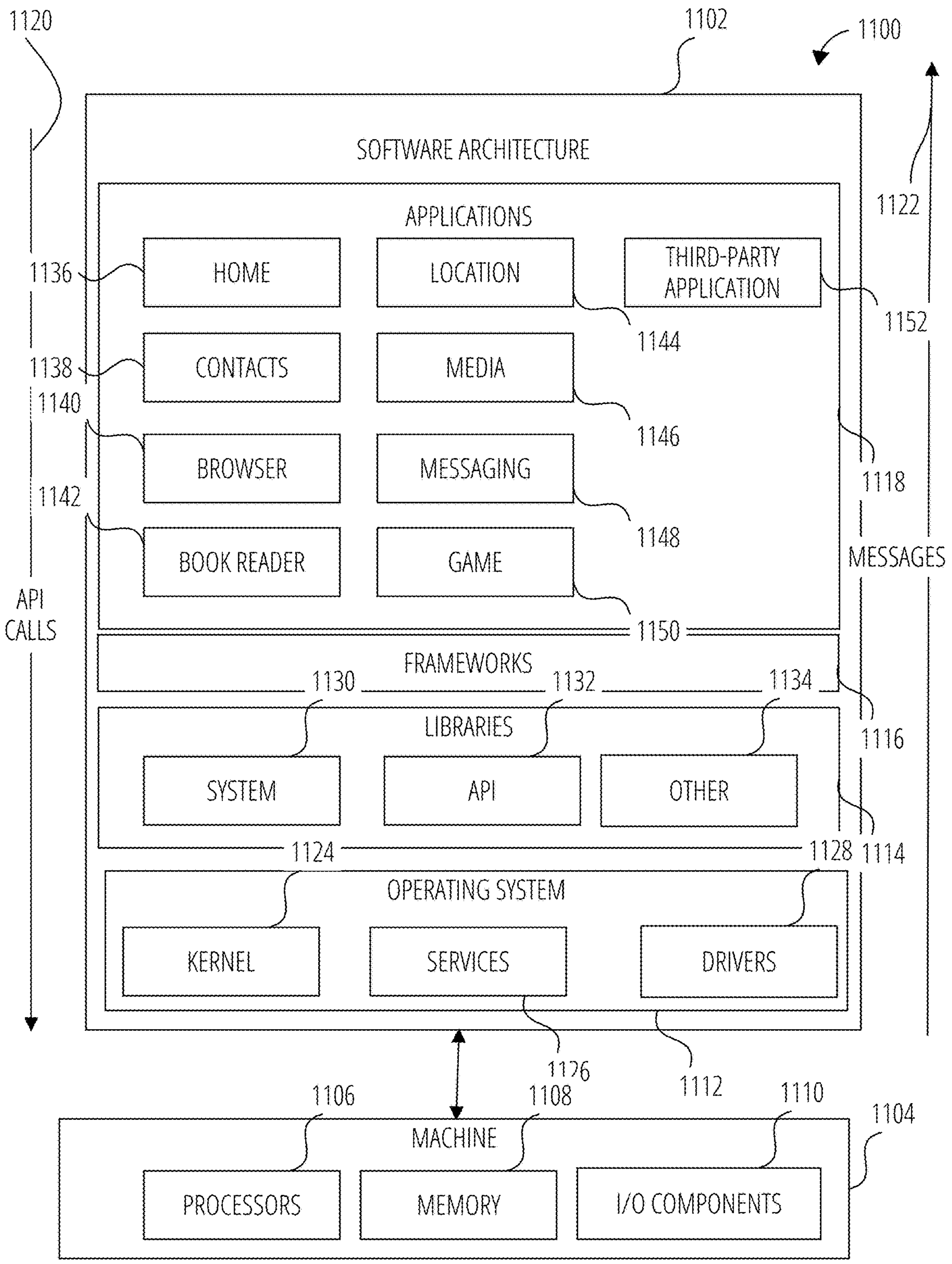
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture

1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

Machine-Learning Pipeline

Figure 13:
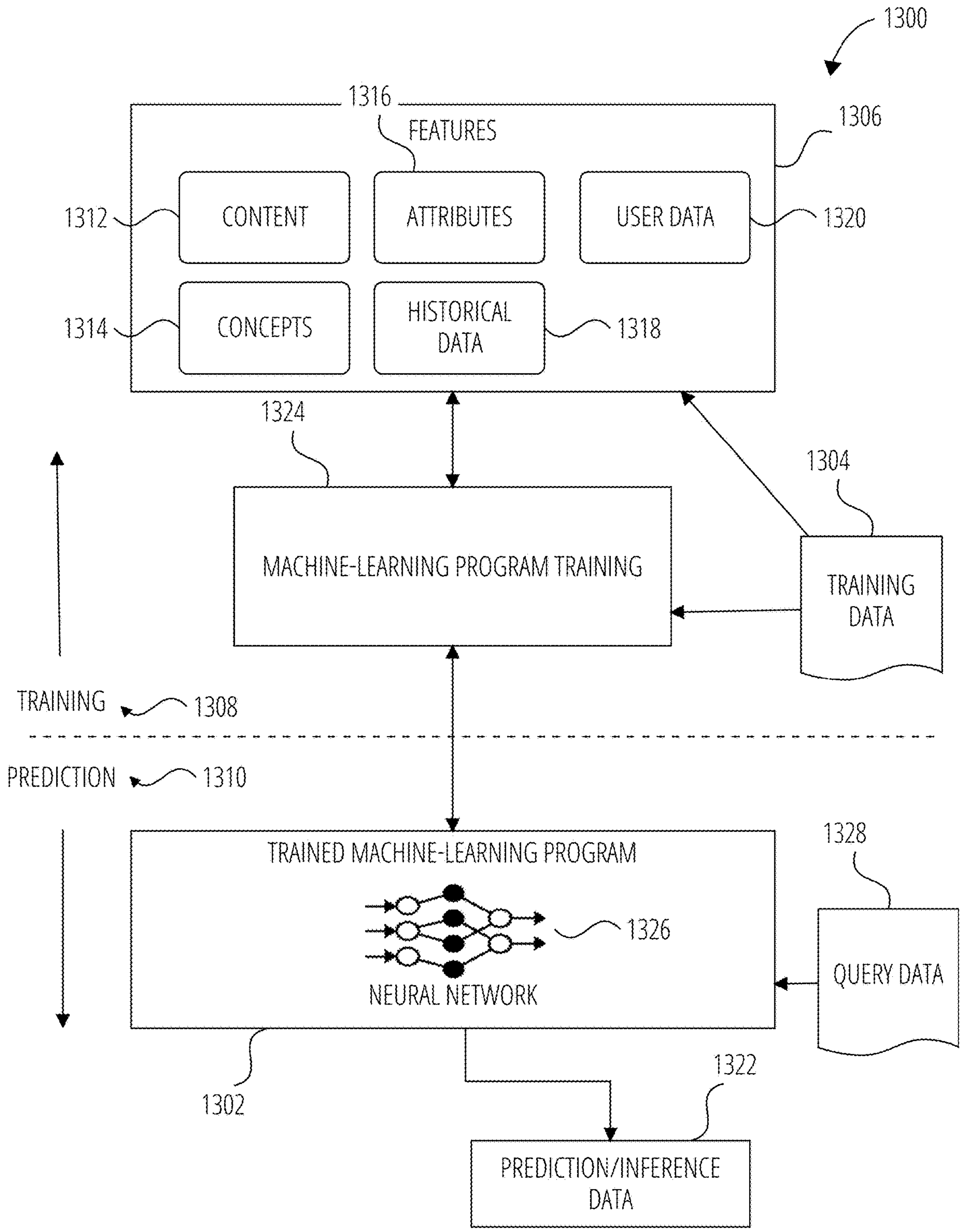
FIG. 13 illustrates training and use of a machine-learning program, according to some examples.

FIG. 13 is a flowchart depicting a machine-learning pipeline 1300, according to some examples. The machine-learning pipelines 1300 may be used to generate a trained model, for example the trained machine-learning program 1302 of FIG. 13, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 12:
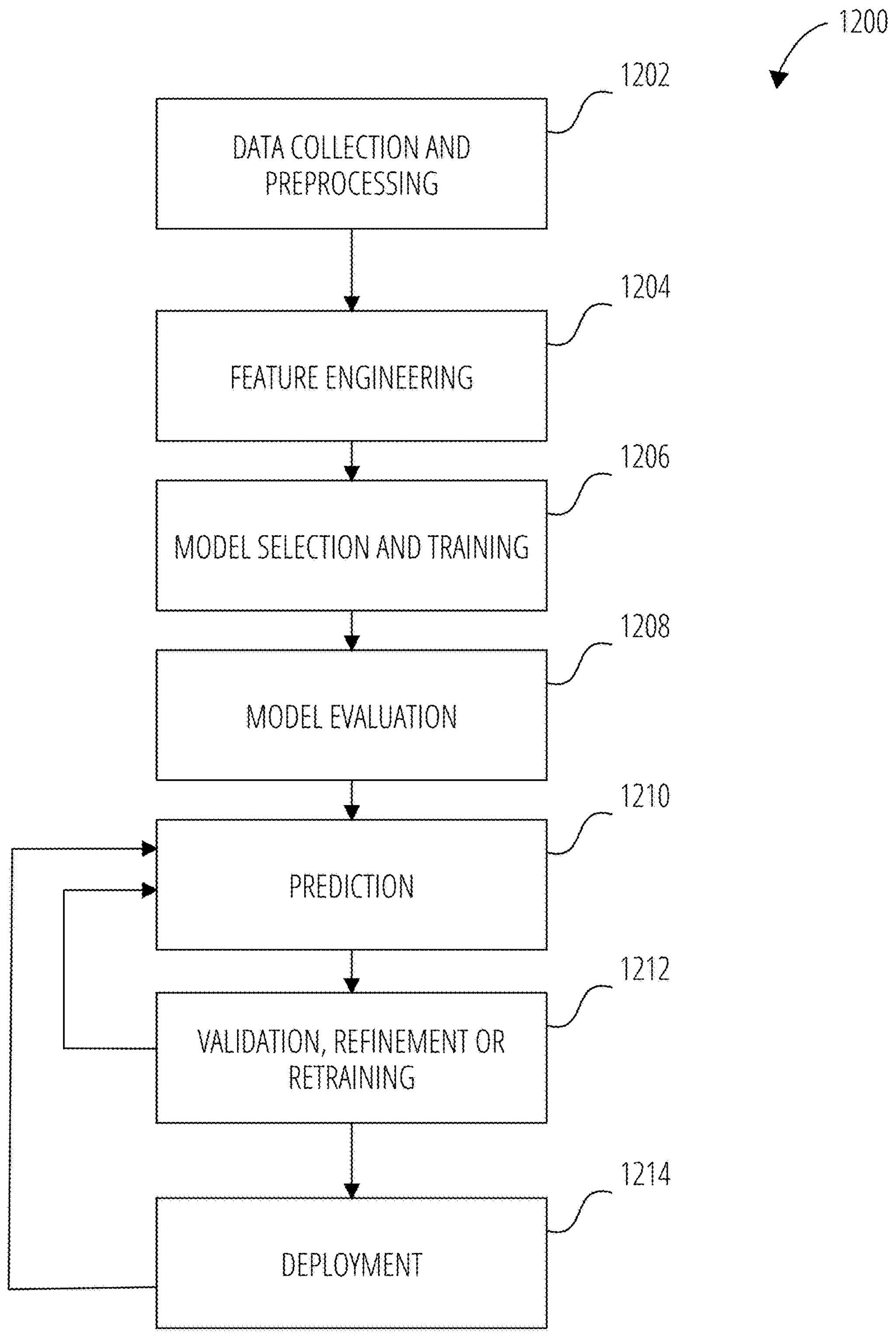
FIG. 12 illustrates a machine-learning pipeline, according to some examples.

Generating a trained machine-learning program 1302 may include multiple types of phases that form part of the machine-learning pipeline 1300, including for example the following phases 1200 illustrated in FIG. 12:

- Data collection and preprocessing 1202: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.
- Feature engineering 1204: This may include selecting and transforming the training data 1304 to create features that are useful for predicting the target variable. Feature engineering may include (1) receiving features 1306 (e.g., as structured or labeled data in supervised learning) and/or (2) identifying features 1306 (e.g., unstructured or unlabeled data for unsupervised learning) in training data 1304.
- Model selection and training 1206: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.
- Model evaluation 1208: This may include evaluating the performance of a trained model (e.g., the trained machine-learning program 1302) on a separate testing dataset. This can help determine if the model is overfitting or underfitting and if it is suitable for deployment.
- Prediction 1210: This involves using a trained model (e.g., trained machine-learning program 1302) to generate predictions on new, unseen data.
- Validation, refinement or retraining 1212: This may include updating a model based on feedback generated from the prediction phase, such as new data or user feedback.
- Deployment 1214: This may include integrating the trained model (e.g., the trained machine-learning program 1302) into a larger system or application, such as a web service, mobile app, or IoT device. This can involve setting up APIs, building a user interface, and ensuring that the model is scalable and can handle large volumes of data.

FIG. 13 illustrates two example phases, namely a training phase 1308 (part of the model selection and trainings 1206) and a prediction phase 1310 (part of prediction 1210). Prior to the training phase 1308, feature engineering 1204 is used to identify features 1306. This may include identifying informative, discriminating, and independent features for the effective operation of the trained machine-learning program 1302 in pattern recognition, classification, and regression. In some examples, the training data 1304 includes labeled data, which is known data for pre-identified features 1306 and one or more outcomes.

Each of the features 1306 may be a variable or attribute, such as individual measurable property of a process, article, system, or phenomenon represented by a data set (e.g., the training data 1304). Features 1306 may also be of different types, such as numeric features, strings, vectors, matrices, encodings, and graphs, and may include one or more of content 1312, concepts 1314, attributes 1316, historical data 1318 and/or user data 1320, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 1308, the machine-learning pipeline 1300 uses the training data 1304 to find correlations among the features 1306 that affect a predicted outcome or prediction/inference data 1322.

With the training data 1304 and the identified features 1306, the trained machine-learning program 1302 is trained during the training phase 1308 during machine-learning program training 1324. The machine-learning program training 1324 appraises values of the features 1306 as they correlate to the training data 1304. The result of the training is the trained machine-learning program 1302 (e.g., a trained or learned model).

Further, the training phase 1308 may involve machine learning, in which the training data 1304 is structured (e.g., labeled during preprocessing operations), and the trained machine-learning program 1302 implements a relatively simple neural network 1326 capable of performing, for example, classification and clustering operations. In other examples, the training phase 1308 may involve deep learning, in which the training data 1304 is unstructured, and the trained machine-learning program 1302 implements a deep neural network 1326 that is able to perform both feature extraction and classification/clustering operations.

A neural network 1326 may, in some examples, be generated during the training phase 1308, and implemented within the trained machine-learning program 1302. The neural network 1326 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 1326 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1326 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1308, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 1326 is iteratively trained by adjusting model parameters to minimize a specific loss function or maximize a certain objective. The system can continue to train the neural network 1326 by adjusting parameters based on the output of the validation, refinement, or retraining block 1212, and rerun the prediction 1210 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 1326 even after deployment 1214 of the neural network 1326. The neural network 1326 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 1310, the trained machine-learning program 1302 uses the features 1306 for analyzing query data 1328 to generate inferences, outcomes, or predictions, as examples of a prediction/inference data 1322. For example, during prediction phase 1310, the trained machine-learning program 1302 is used to generate an output. Query data 1328 is provided as an input to the trained machine-learning program 1302, and the trained machine-learning program 1302 generates the prediction/inference data 1322 as output, responsive to receipt of the query data 1328. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 1302 may be a generative AI model. Generative AI is a term that may refer to any type of artificial intelligence that can create new content from training data 1304. For example, generative AI can produce text, images, video, audio, code or synthetic data that are similar to the original data but not identical.

Some of the techniques that may be used in generative AI are:

- Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
- Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis
- Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.

Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.

Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1322 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: receiving a prompt from a developer; accessing a three dimensional head mesh; generating a textured three dimensional head mesh by: inputting the prompt into a stable diffusion model; retrieving a plurality of two dimensional images for the texture; and projecting the plurality of two dimensional images onto the three dimensional head mesh; accessing a camera feed from a camera system of a user, the camera feed including a head of the user; and applying a first content augmentation corresponding to the textured three dimensional head mesh to the head of the user in the camera feed.

In Example 2, the subject matter of Example 1 includes, wherein the plurality of two dimensional images include four views of a head that correspond to the prompt.

In Example 3, the subject matter of Example 2 includes, wherein the four views include a front view, a left view, a right view, and a top view. The system of Example 2, wherein the operations further comprise: assigning a weighting of a certain facial feature based on the type of view for the plurality of two dimensional images, and projecting a texture of the facial feature onto the three dimensional head mesh from one of the two dimensional images based on the weightings. The system of claim 1, wherein the operations further comprise: generating a first two dimensional view from the textured three dimensional head mesh; adding noise to the two dimensional view to generate a second two dimensional view; denoising the second two dimensional view to generate a third two dimensional view; and projecting the third two dimensional view onto the textured three dimensional head mesh to generate an updated textured three dimensional head mesh.

In Example 4, the subject matter of Examples 1-3 includes, wherein the operations further comprise: comparing the updated textured three dimensional head mesh with the textured three dimensional head mesh to identify a loss; and further modifying the updated textured three dimensional head mesh causing a reduction in the loss.

In Example 5, the subject matter of Examples 1~4 includes, wherein the operations further comprise training the stable diffusion model to generate a plurality of two dimensional images based on inputted prompts.

Example 6 is a method comprising: receiving a prompt from a developer; accessing a three dimensional head mesh; generating a textured three dimensional head mesh by: inputting the prompt into a stable diffusion model; retrieving a plurality of two dimensional images for the texture; and projecting the plurality of two dimensional images onto the three dimensional head mesh; accessing a camera feed from a camera system of a user, the camera feed including a head of the user; and applying a first content augmentation corresponding to the textured three dimensional head mesh to the head of the user in the camera feed.

In Example 7, the subject matter of Example 6 includes, wherein the plurality of two dimensional images include four views of a head that correspond to the prompt.

In Example 6, the subject matter of Example 7 includes, wherein the four views include a front view, a left view, a right view, and a top view. The method of Example 7, wherein the operations further comprise: assigning a weighting of a certain facial feature based on the type of view for the plurality of two dimensional images, and projecting a texture of the facial feature onto the three dimensional head mesh from one of the two dimensional images based on the weightings. The method of claim 8, wherein the operations further comprise: generating a first two dimensional view from the textured three dimensional head mesh; adding noise to the two dimensional view to generate a second two dimensional view; denoising the second two dimensional view to generate a third two dimensional view; and projecting the third two dimensional view onto the textured three dimensional head mesh to generate an updated textured three dimensional head mesh.

In Example 9, the subject matter of Examples 6-6 includes, wherein the operations further comprise: comparing the updated textured three dimensional head mesh with the textured three dimensional head mesh to identify a loss; and further modifying the updated textured three dimensional head mesh causing a reduction in the loss.

In Example 10, the subject matter of Examples 6-9 includes, wherein the operations further comprise training the stable diffusion model to generate a plurality of two dimensional images based on inputted prompts.

Example 11 is a non-transitory computer-readable storage medium storing instructions that, when executed by at least one processor, cause the at least one processor to perform operations comprising: receiving a prompt from a developer; accessing a three dimensional head mesh; generating a textured three dimensional head mesh by: inputting the prompt into a stable diffusion model; retrieving a plurality of two dimensional images for the texture; and projecting the plurality of two dimensional images onto the three dimensional head mesh; accessing a camera feed from a camera system of a user, the camera feed including a head of the user; and applying a first content augmentation corresponding to the textured three dimensional head mesh to the head of the user in the camera feed.

In Example 12, the subject matter of Example 11 includes, wherein the plurality of two dimensional images include four views of a head that correspond to the prompt.

In Example 13, the subject matter of Example 12 includes, wherein the four views include a front view, a left view, a right view, and a top view. The non-transitory computer-readable storage medium of Example 12, wherein the operations further comprise: assigning a weighting of a certain facial feature based on the type of view for the plurality of two dimensional images, and projecting a texture of the facial feature onto the three dimensional head mesh from one of the two dimensional images based on the weightings. The non-transitory computer-readable storage medium of claim 11, wherein the operations further comprise: generating a first two dimensional view from the textured three dimensional head mesh; adding noise to the two dimensional view to generate a second two dimensional view; denoising the second two dimensional view to generate a third two dimensional view; and projecting the third two dimensional view onto the textured three dimensional head mesh to generate an updated textured three dimensional head mesh.

In Example 14, the subject matter of Examples 11-13 includes, wherein the operations further comprise: comparing the updated textured three dimensional head mesh with the textured three dimensional head mesh to identify a loss; and further modifying the updated textured three dimensional head mesh causing a reduction in the loss.

Example 15 is at least one machine-readable medium including instructions that, when executed by processing circuitry, cause the processing circuitry to perform operations to implement any of Examples 1-14.

Example 16 is an apparatus comprising means to implement any of Examples 1-14.

Example 17 is a system to implement any of Examples 1-14.

Example 18 is a method to implement any of Examples 1-14.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

CONCLUSION

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
at least one processor; and
at least one memory component storing instructions that, when executed by the at least one processor, cause the at least one processor to perform operations comprising:
training a stable diffusion model to generate a plurality of two dimensional images based on inputted prompts;
receiving a prompt from a developer;
accessing a three dimensional head mesh;
generating a textured three dimensional head mesh by:
inputting the prompt into the stable diffusion model;
retrieving a plurality of two dimensional images for the texture from the stable diffusion model based on the inputting of the prompt; and
projecting the plurality of two dimensional images onto the three dimensional head mesh;
accessing a real-time camera feed from a camera system of a user, the camera feed including a head of the user; and
applying a first content augmentation corresponding to the textured three dimensional head mesh to the head of the user continuously in the real-time camera feed, following the head of the user within the real-time camera feed;
subsequent to the generation of the textured three dimensional head mesh:
detecting an inconsistency on the textured three dimensional head mesh caused by differences between at least two of the plurality of two dimensional images:
generating a first two dimensional view of a portion of the textured three dimensional head mesh that corresponds to the detected inconsistency;
adding noise to the two dimensional view to generate a second two dimensional view;
denoising the second two dimensional view to generate a third two dimensional view;
repeating the detecting of the inconsistency with the denoised image, generating the next two dimensional view, adding the noise, and denoising the next two dimensional view until the inconsistency reaches an inconsistency threshold; and
projecting the third two dimensional view onto the textured three dimensional head mesh to generate an updated textured three dimensional head mesh.

2. The system of claim 1, wherein the plurality of two dimensional images include four views of a head that correspond to the prompt.

3. The system of claim 2, wherein the four views include a front view, a left view, a right view, and a top view.

4. The system of claim 2, wherein the operations further comprise:
assigning individual weighting values to a plurality of facial features based on the type of view for the plurality of two dimensional images;
determining that for a particular facial feature, there is an overlap between the two dimensional images; and
projecting a texture of the facial feature onto the three dimensional head mesh from one of the two dimensional images corresponding to a higher weighting value.

5. The system of claim 1, wherein the operations further comprise, subsequent to the generation of the textured three dimensional head mesh:
detecting an inconsistency on the textured three dimensional head mesh caused by differences between at least two of the plurality of two dimensional images;
generating a first two dimensional view of a portion of the textured three dimensional head mesh that corresponds to the detected inconsistency;
adding noise to the two dimensional view to generate a second two dimensional view;
denoising the second two dimensional view to generate a third two dimensional view;
repeating the detecting of the inconsistency with the denoised image, generating the next two dimensional view, adding the noise, and denoising the next two dimensional view until the inconsistency reaches an inconsistency threshold; and
projecting the third two dimensional view onto the textured three dimensional head mesh to generate an updated textured three dimensional head mesh.

6. The system of claim 1, wherein the operations further comprise:
comparing the updated textured three dimensional head mesh with the textured three dimensional head mesh to identify a loss; and
further modifying the updated textured three dimensional head mesh causing a reduction in the loss.

7. The system of claim 1, wherein the operations further comprise training the stable diffusion model to generate a plurality of two dimensional images based on inputted prompts.

8. The system of claim 1, wherein accessing the three dimensional head mesh comprises accessing a head mesh that is rigged using a skeletal structure including a plurality of bones corresponding to facial regions of a head,
wherein the skeletal structure is configured to map control points directly onto vertices of the three dimensional head mesh via the plurality of bones;
wherein the control points comprise joint clusters or control vertices that are directly bound to the three dimensional head mesh through the skeletal structure,
wherein the skeletal structure maintains positional correspondence between the three dimensional head mesh and the head of the user during application of the first content augmentation.

9. The system of claim 1, wherein the operations further comprise:
receiving a source image from the user,
wherein inputting the prompt into the stable diffusion model further comprises inputting the source image into the stable diffusion model, and
wherein the stable diffusion model generates the plurality of two dimensional images for the texture based on both the prompt and the source image.

10. The system of claim 9, wherein the operations further comprise:

accessing a depth map of the head of the user, wherein inputting the prompt and the source image into the stable diffusion model further comprises inputting the depth map into the stable diffusion model, and wherein the stable diffusion model generates the plurality of two dimensional images for the texture based on the prompt, the source image, and the depth map.

11. The system of claim 1, wherein accessing the camera feed from the camera system of the user comprises accessing a camera feed from a virtual reality headset worn by the user, wherein the first content augmentation is applied to the real-time camera feed from the virtual reality headset.

12. The system of claim 1, wherein the operations further comprise:

assigning individual weighting values to a plurality of pixels based on the type of view for the plurality of two dimensional images;

determining that for a particular pixel, there is an overlap between the two dimensional images; and projecting a texture of the pixel onto the three dimensional head mesh from one of the two dimensional images corresponding to a higher weighting value.

13. A method comprising:

training a stable diffusion model to generate a plurality of two dimensional images based on inputted prompts;

receiving a prompt from a developer;

accessing a three dimensional head mesh;

generating a textured three dimensional head mesh by:

inputting the prompt into the stable diffusion model;

retrieving a plurality of two dimensional images for the texture from the stable diffusion model based on the inputting of the prompt; and projecting the plurality of two dimensional images onto the three dimensional head mesh;

accessing a real-time camera feed from a camera system of a user, the camera feed including a head of the user; and applying a first content augmentation corresponding to the textured three dimensional head mesh to the head of the user continuously in the real-time camera feed, following the head of the user within the real-time camera feed;

subsequent to the generation of the textured three dimensional head mesh:

detecting an inconsistency on the textured three dimensional head mesh caused by differences between at least two of the plurality of two dimensional images:

generating a first two dimensional view of a portion of the textured three dimensional head mesh that corresponds to the detected inconsistency;

adding noise to the two dimensional view to generate a second two dimensional view;

denoising the second two dimensional view to generate a third two dimensional view;

repeating the detecting of the inconsistency with the denoised image, generating the next two dimensional view, adding the noise, and denoising the next two dimensional view until the inconsistency reaches an inconsistency threshold; and projecting the third two dimensional view onto the textured three dimensional head mesh to generate an updated textured three dimensional head mesh.

14. The method of claim 13, wherein the plurality of two dimensional images include four views of a head that correspond to the prompt.

15. The method of claim 14, wherein the four views include a front view, a left view, a right view, and a top view.

16. The method of claim 14, wherein the operations further comprise:

assigning a weighting of a certain facial feature based on the type of view for the plurality of two dimensional images, and projecting a texture of the facial feature onto the three dimensional head mesh from one of the two dimensional images based on the weightings.

17. The method of claim 13, wherein the operations further comprise:

generating a first two dimensional view from the textured three dimensional head mesh;

adding noise to the two dimensional view to generate a second two dimensional view;

denoising the second two dimensional view to generate a third two dimensional view; and projecting the third two dimensional view onto the textured three dimensional head mesh to generate an updated textured three dimensional head mesh.

18. The method of claim 13, wherein the operations further comprise:

comparing the updated textured three dimensional head mesh with the textured three dimensional head mesh to identify a loss; and further modifying the updated textured three dimensional head mesh causing a reduction in the loss.

19. The method of claim 13, wherein the operations further comprise training the stable diffusion model to generate a plurality of two dimensional images based on inputted prompts.

20. Anon-transitory computer-readable storage medium storing instructions that, when executed by at least one processor, cause the at least one processor to perform operations comprising:

training a stable diffusion model to generate a plurality of two dimensional images based on inputted prompts;

receiving a prompt from a developer;

accessing a three dimensional head mesh;

generating a textured three dimensional head mesh by:

inputting the prompt into the stable diffusion model;

retrieving a plurality of two dimensional images for the texture from the stable diffusion model based on the inputting of the prompt; and projecting the plurality of two dimensional images onto the three dimensional head mesh;

accessing a real-time camera feed from a camera system of a user, the camera feed including a head of the user; and applying a first content augmentation corresponding to the textured three dimensional head mesh to the head of the user continuously in the real-time camera feed, following the head of the user within the real-time camera feed;

subsequent to the generation of the textured three dimensional head mesh:

detecting an inconsistency on the textured three dimensional head mesh caused by differences between at least two of the plurality of two dimensional images;

generating a first two dimensional view of a portion of the textured three dimensional head mesh that corresponds to the detected inconsistency;

adding noise to the two dimensional view to generate a second two dimensional view;

denoising the second two dimensional view to generate a third two dimensional view;

repeating the detecting of the inconsistency with the denoised image, generating the next two dimensional view, adding the noise, and denoising the next two dimensional view until the inconsistency reaches an inconsistency threshold; and projecting the third two dimensional view onto the textured three dimensional head mesh to generate an updated textured three dimensional head mesh.

* * * * *